United States Patent
Ochi et al.

(10) Patent No.: US 7,143,008 B2
(45) Date of Patent: Nov. 28, 2006

(54) METHOD OF COLLECTING AND STORING STORAGE NETWORK PERFORMANCE INFORMATION, COMPUTER SYSTEM, AND PROGRAM

(75) Inventors: Hiroyuki Ochi, Yokohama (JP); Hideo Ohata, Fujisawa (JP); Kei Takeda, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 63 days.

(21) Appl. No.: 10/998,749

(22) Filed: Nov. 30, 2004

(65) Prior Publication Data

US 2006/0085166 A1    Apr. 20, 2006

(30) Foreign Application Priority Data

Oct. 5, 2004    (JP) .............................. 2004-292849

(51) Int. Cl.
   *G06F 11/30* (2006.01)
(52) U.S. Cl. .................... 702/186; 702/80; 702/180; 702/182; 702/183; 702/184; 702/185; 702/187; 702/188
(58) Field of Classification Search ............... 702/186, 702/180, 80, 182–185, 187, 188; 709/213–216, 709/224; 717/127
   See application file for complete search history.

(56) References Cited

U.S. PATENT DOCUMENTS

| | | | | |
|---|---|---|---|---|
| 5,231,593 | A | * | 7/1993 | Notess ........................ 702/180 |
| 2005/0193168 | A1 | * | 9/2005 | Eguchi et al. .............. 711/114 |
| 2005/0210098 | A1 | * | 9/2005 | Nakamichi et al. ......... 709/203 |

* cited by examiner

*Primary Examiner*—Marc S. Hoff
*Assistant Examiner*—Phuong Huynh
(74) *Attorney, Agent, or Firm*—Mattingly, Stanger, Malur & Brundidge, P.C.

(57) ABSTRACT

To provide a method of collecting and storing storage network performance information that allows tracking of the cause of application performance deterioration. It is automatically judged whether or not performance information collected, to be stored, from components of a storage network including a host server and a storage system has a possibility of ever being used in a search for the cause of application performance deterioration, and the degree of importance of performance information is determined based on the result of the judgment. The preservation period of performance information that is high in degree of importance is set long, while a short preservation period is set to performance information of low degree of importance. After the preservation period set to the respective performance information expires, the corresponding performance information is deleted.

15 Claims, 31 Drawing Sheets

METRICS VALUE TABLE /110

| RESOURCE IDENTIFIER | METRICS IDENTIFIER | METRICS VALUE | T1 | T2 |
|---|---|---|---|---|
| FILE SYSTEM X | I/O COUNT PER SECOND | 1,000.0 | 00:00 JANUARY 1, 2000 | 01:00 JANUARY 1, 2000 |
| 411 | 412 | 413 | 414 | 415 |

FIG. 4A

METRICS VALUE TABLE OF HOST MONITORING AGENT A /401

| RESOURCE IDENTIFIER | METRICS IDENTIFIER | METRICS VALUE | T1 | T2 |
|---|---|---|---|---|
| FILE SYSTEM A | I/O COUNT PER SECOND | 1,214.5 | 10:00 JANUARY 11, 2000 | 11:00 JANUARY 11, 2000 |
| FILE SYSTEM A | I/O COUNT PER SECOND | 503.0 | 11:00 JANUARY 11, 2000 | 12:00 JANUARY 11, 2000 |
| FILE SYSTEM A | I/O COUNT PER SECOND | 1,248.1 | 12:00 JANUARY 11, 2000 | 13:00 JANUARY 11, 2000 |
| FILE SYSTEM A | I/O COUNT PER SECOND | 1,685.4 | 13:00 JANUARY 11, 2000 | 14:00 JANUARY 11, 2000 |
| : | : | : | : | : |
| VOLUME A | I/O COUNT PER SECOND | 1,109.3 | 10:00 JANUARY 11, 2000 | 11:00 JANUARY 11, 2000 |
| VOLUME A | I/O COUNT PER SECOND | 809.0 | 11:00 JANUARY 11, 2000 | 12:00 JANUARY 11, 2000 |
| VOLUME A | I/O COUNT PER SECOND | 2,083.1 | 12:00 JANUARY 11, 2000 | 13:00 JANUARY 11, 2000 |
| VOLUME A | I/O COUNT PER SECOND | 2,103.5 | 13:00 JANUARY 11, 2000 | 14:00 JANUARY 11, 2000 |
| : | : | : | : | : |
| PORT A | I/O COUNT PER SECOND | 1,237.5 | 10:00 JANUARY 11, 2000 | 11:00 JANUARY 11, 2000 |
| PORT A | I/O COUNT PER SECOND | 3,278.3 | 11:00 JANUARY 11, 2000 | 12:00 JANUARY 11, 2000 |
| PORT A | I/O COUNT PER SECOND | 4,292.3 | 12:00 JANUARY 11, 2000 | 13:00 JANUARY 11, 2000 |
| PORT A | I/O COUNT PER SECOND | 2,435.2 | 13:00 JANUARY 11, 2000 | 14:00 JANUARY 11, 2000 |
| : | : | : | : | : |
| 402 | 403 | 404 | 405 | 406 |

FIG. 4B

METRICS VALUE TABLE OF HOST MONITORING AGENT B

501

| RESOURCE IDENTIFIER | METRICS IDENTIFIER | METRICS VALUE | T1 | T2 |
|---|---|---|---|---|
| FILE SYSTEM G | I/O COUNT PER SECOND | 3,223.5 | 10:00 JANUARY 11, 2000 | 11:00 JANUARY 11, 2000 |
| FILE SYSTEM G | I/O COUNT PER SECOND | 2,253.6 | 11:00 JANUARY 11, 2000 | 12:00 JANUARY 11, 2000 |
| FILE SYSTEM G | I/O COUNT PER SECOND | 892.2 | 12:00 JANUARY 11, 2000 | 13:00 JANUARY 11, 2000 |
| FILE SYSTEM G | I/O COUNT PER SECOND | 2,192.4 | 13:00 JANUARY 11, 2000 | 14:00 JANUARY 11, 2000 |
| ⋮ | ⋮ | ⋮ | ⋮ | ⋮ |
| VOLUME D | I/O COUNT PER SECOND | 2,394.9 | 10:00 JANUARY 11, 2000 | 11:00 JANUARY 11, 2000 |
| VOLUME D | I/O COUNT PER SECOND | 1,403.0 | 11:00 JANUARY 11, 2000 | 12:00 JANUARY 11, 2000 |
| VOLUME D | I/O COUNT PER SECOND | 3,048.3 | 12:00 JANUARY 11, 2000 | 13:00 JANUARY 11, 2000 |
| VOLUME D | I/O COUNT PER SECOND | 1,932.4 | 13:00 JANUARY 11, 2000 | 14:00 JANUARY 11, 2000 |
| ⋮ | ⋮ | ⋮ | ⋮ | ⋮ |
| PORT B | I/O COUNT PER SECOND | 3,235.6 | 10:00 JANUARY 11, 2000 | 11:00 JANUARY 11, 2000 |
| PORT B | I/O COUNT PER SECOND | 2,378.0 | 11:00 JANUARY 11, 2000 | 12:00 JANUARY 11, 2000 |
| PORT B | I/O COUNT PER SECOND | 1,190.2 | 12:00 JANUARY 11, 2000 | 13:00 JANUARY 11, 2000 |
| PORT B | I/O COUNT PER SECOND | 3,394.5 | 13:00 JANUARY 11, 2000 | 14:00 JANUARY 11, 2000 |
| ⋮ | ⋮ | ⋮ | ⋮ | ⋮ |
| 502 | 503 | 504 | 505 | 506 |

FIG. 5

METRICS VALUE TABLE OF STORAGE SUBSYSTEM MONITORING AGENT 601

| RESOURCE IDENTIFIER | METRICS IDENTIFIER | METRICS VALUE | T1 | T2 |
|---|---|---|---|---|
| PORT N | I/O COUNT PER SECOND | 1,402.5 | 10:00 JANUARY 11, 2000 | 11:00 JANUARY 11, 2000 |
| PORT N | I/O COUNT PER SECOND | 5,492.2 | 11:00 JANUARY 11, 2000 | 12:00 JANUARY 11, 2000 |
| PORT N | I/O COUNT PER SECOND | 5,327.3 | 12:00 JANUARY 11, 2000 | 13:00 JANUARY 11, 2000 |
| PORT N | I/O COUNT PER SECOND | 3,380.2 | 13:00 JANUARY 11, 2000 | 14:00 JANUARY 11, 2000 |
| : | : | : | : | : |
| LOGICAL VOLUME A | I/O COUNT PER SECOND | 721.2 | 10:00 JANUARY 11, 2000 | 11:00 JANUARY 11, 2000 |
| LOGICAL VOLUME A | I/O COUNT PER SECOND | 2,374.3 | 11:00 JANUARY 11, 2000 | 12:00 JANUARY 11, 2000 |
| LOGICAL VOLUME A | I/O COUNT PER SECOND | 3,364.1 | 12:00 JANUARY 11, 2000 | 13:00 JANUARY 11, 2000 |
| LOGICAL VOLUME A | I/O COUNT PER SECOND | 2,789.3 | 13:00 JANUARY 11, 2000 | 14:00 JANUARY 11, 2000 |
| : | : | : | : | : |
| RAID GROUP A | I/O COUNT PER SECOND | 1,586.6 | 10:00 JANUARY 11, 2000 | 11:00 JANUARY 11, 2000 |
| RAID GROUP A | I/O COUNT PER SECOND | 3,582.1 | 11:00 JANUARY 11, 2000 | 12:00 JANUARY 11, 2000 |
| RAID GROUP A | I/O COUNT PER SECOND | 4,126.1 | 12:00 JANUARY 11, 2000 | 13:00 JANUARY 11, 2000 |
| RAID GROUP A | I/O COUNT PER SECOND | 3,345.8 | 13:00 JANUARY 11, 2000 | 14:00 JANUARY 11, 2000 |
| : | : | : | : | : |
| 602 | 603 | 604 | 605 | 606 |

FIG. 6

METRICS VALUE TABLE OF SAN SWITCH MONITORING AGENT 701

| RESOURCE IDENTIFIER | METRICS IDENTIFIER | METRICS VALUE | T1 | T2 |
|---|---|---|---|---|
| PORT C | I/O COUNT PER SECOND | 1,719.5 | 10:00 JANUARY 11, 2000 | 11:00 JANUARY 11, 2000 |
| PORT C | I/O COUNT PER SECOND | 6,322.3 | 11:00 JANUARY 11, 2000 | 12:00 JANUARY 11, 2000 |
| PORT C | I/O COUNT PER SECOND | 6,012.4 | 12:00 JANUARY 11, 2000 | 13:00 JANUARY 11, 2000 |
| PORT C | I/O COUNT PER SECOND | 3,581.0 | 13:00 JANUARY 11, 2000 | 14:00 JANUARY 11, 2000 |
| : | : | : | : | : |
| 702 | 703 | 704 | 705 | 706 |

FIG. 7

METRICS VALUE TABLE——113

| RESOURCE IDENTIFIER | METRICS IDENTIFIER | METRICS VALUE | T1 | T2 |
|---|---|---|---|---|
| FILE SYSTEM A | I/O COUNT PER SECOND | 1,214.5 | 10:00 JANUARY 11, 2000 | 11:00 JANUARY 11, 2000 |
| FILE SYSTEM A | I/O COUNT PER SECOND | 503.0 | 11:00 JANUARY 11, 2000 | 12:00 JANUARY 11, 2000 |
| FILE SYSTEM A | I/O COUNT PER SECOND | 1,248.1 | 12:00 JANUARY 11, 2000 | 13:00 JANUARY 11, 2000 |
| FILE SYSTEM A | I/O COUNT PER SECOND | 1,685.4 | 13:00 JANUARY 11, 2000 | 14:00 JANUARY 11, 2000 |
| ⋮ | ⋮ | ⋮ | ⋮ | ⋮ |
| VOLUME A | I/O COUNT PER SECOND | 1,109.3 | 10:00 JANUARY 11, 2000 | 11:00 JANUARY 11, 2000 |
| VOLUME A | I/O COUNT PER SECOND | 809.0 | 11:00 JANUARY 11, 2000 | 12:00 JANUARY 11, 2000 |
| VOLUME A | I/O COUNT PER SECOND | 2,083.1 | 12:00 JANUARY 11, 2000 | 13:00 JANUARY 11, 2000 |
| VOLUME A | I/O COUNT PER SECOND | 2,103.5 | 13:00 JANUARY 11, 2000 | 14:00 JANUARY 11, 2000 |
| ⋮ | ⋮ | ⋮ | ⋮ | ⋮ |
| PORT A | I/O COUNT PER SECOND | 1,237.5 | 10:00 JANUARY 11, 2000 | 11:00 JANUARY 11, 2000 |
| PORT A | I/O COUNT PER SECOND | 3,278.3 | 11:00 JANUARY 11, 2000 | 12:00 JANUARY 11, 2000 |
| PORT A | I/O COUNT PER SECOND | 4,292.3 | 12:00 JANUARY 11, 2000 | 13:00 JANUARY 11, 2000 |
| PORT A | I/O COUNT PER SECOND | 2,435.2 | 13:00 JANUARY 11, 2000 | 14:00 JANUARY 11, 2000 |
| ⋮ | ⋮ | ⋮ | ⋮ | ⋮ |
| PORT C | I/O COUNT PER SECOND | 1,719.5 | 10:00 JANUARY 11, 2000 | 11:00 JANUARY 11, 2000 |
| PORT C | I/O COUNT PER SECOND | 6,322.3 | 11:00 JANUARY 11, 2000 | 12:00 JANUARY 11, 2000 |
| PORT C | I/O COUNT PER SECOND | 6,012.4 | 12:00 JANUARY 11, 2000 | 13:00 JANUARY 11, 2000 |
| PORT C | I/O COUNT PER SECOND | 3,581.0 | 13:00 JANUARY 11, 2000 | 14:00 JANUARY 11, 2000 |
| ⋮ | ⋮ | ⋮ | ⋮ | ⋮ |
| PORT N | I/O COUNT PER SECOND | 1,402.5 | 10:00 JANUARY 11, 2000 | 11:00 JANUARY 11, 2000 |
| PORT N | I/O COUNT PER SECOND | 5,492.2 | 11:00 JANUARY 11, 2000 | 12:00 JANUARY 11, 2000 |
| PORT N | I/O COUNT PER SECOND | 5,327.3 | 12:00 JANUARY 11, 2000 | 13:00 JANUARY 11, 2000 |
| PORT N | I/O COUNT PER SECOND | 3,380.2 | 13:00 JANUARY 11, 2000 | 14:00 JANUARY 11, 2000 |
| ⋮ | ⋮ | ⋮ | ⋮ | ⋮ |
| VOLUME A | I/O COUNT PER SECOND | 721.2 | 10:00 JANUARY 11, 2000 | 11:00 JANUARY 11, 2000 |
| VOLUME A | I/O COUNT PER SECOND | 2,374.3 | 11:00 JANUARY 11, 2000 | 12:00 JANUARY 11, 2000 |
| VOLUME A | I/O COUNT PER SECOND | 3,364.1 | 12:00 JANUARY 11, 2000 | 13:00 JANUARY 11, 2000 |
| VOLUME A | I/O COUNT PER SECOND | 2,789.3 | 13:00 JANUARY 11, 2000 | 14:00 JANUARY 11, 2000 |
| ⋮ | ⋮ | ⋮ | ⋮ | ⋮ |
| RAID GROUP A | I/O COUNT PER SECOND | 1,586.6 | 10:00 JANUARY 11, 2000 | 11:00 JANUARY 11, 2000 |
| RAID GROUP A | I/O COUNT PER SECOND | 3,582.1 | 11:00 JANUARY 11, 2000 | 12:00 JANUARY 11, 2000 |
| RAID GROUP A | I/O COUNT PER SECOND | 4,126.1 | 12:00 JANUARY 11, 2000 | 13:00 JANUARY 11, 2000 |
| RAID GROUP A | I/O COUNT PER SECOND | 3,345.8 | 13:00 JANUARY 11, 2000 | 14:00 JANUARY 11, 2000 |
| ⋮ | ⋮ | ⋮ | ⋮ | ⋮ |
| 801 | 802 | 803 | 804 | 805 |

FIG. 8

APPLICATION-FILE SYSTEM RELATION TABLE —— 1001

| APPLICATION | FILE SYSTEM | EFFECTIVE PERIOD START TIME | EFFECTIVE PERIOD END TIME |
|---|---|---|---|
| APPLICATION X | FILE SYSTEM X | 00:00 JANUARY 1, 2000 | 12:00 JANUARY 1, 2000 |
| 1411 | 1412 | 1413 | 1414 |

*FIG. 14A*

APPLICATION-FILE SYSTEM RELATION TABLE OF APPLICATION MONITORING AGENT A —— 1401

| APPLICATION | FILE SYSTEM | EFFECTIVE PERIOD START TIME | EFFECTIVE PERIOD END TIME |
|---|---|---|---|
| APPLICATION A | FILE SYSTEM A | 00:00 JANUARY 1, 2000 | 13:00 JANUARY 14, 2000 |
| APPLICATION A | FILE SYSTEM B | 00:00 JANUARY 1, 2000 | 13:00 JANUARY 14, 2000 |
| APPLICATION A | FILE SYSTEM C | 00:00 JANUARY 1, 2000 | 13:00 JANUARY 14, 2000 |
| APPLICATION A | FILE SYSTEM D | 00:00 JANUARY 1, 2000 | 13:00 JANUARY 14, 2000 |
| APPLICATION A | FILE SYSTEM E | 00:00 JANUARY 1, 2000 | 13:00 JANUARY 14, 2000 |
| 1402 | 1403 | 14043 | 1405 |

*FIG. 14B*

APPLICATION-FILE SYSTEM RELATION TABLE OF
APPLICATION MONITORING AGENT B — 1501

| APPLICATION | FILE SYSTEM | EFFECTIVE PERIOD START TIME | EFFECTIVE PERIOD END TIME |
|---|---|---|---|
| APPLICATION B | FILE SYSTEM E | 00:00 JANUARY 1, 2000 | 13:00 JANUARY 14, 2000 |
| APPLICATION B | FILE SYSTEM F | 00:00 JANUARY 1, 2000 | 13:00 JANUARY 14, 2000 |

APPLICATION-FILE SYSTEM RELATION TABLE OF
APPLICATION MONITORING AGENT C — 1601

| APPLICATION | FILE SYSTEM | EFFECTIVE PERIOD START TIME | EFFECTIVE PERIOD END TIME |
|---|---|---|---|
| APPLICATION C | FILE SYSTEM G | 00:00 JANUARY 1, 2000 | 13:00 JANUARY 14, 2000 |
| APPLICATION C | FILE SYSTEM H | 00:00 JANUARY 1, 2000 | 13:00 JANUARY 14, 2000 |

APPLICATION-FILE SYSTEM RELATION TABLE —— 1301

| APPLICATION | FILE SYSTEM | EFFECTIVE PERIOD START TIME | EFFECTIVE PERIOD END TIME |
|---|---|---|---|
| APPLICATION A | FILE SYSTEM A | 00:00 JANUARY 1, 2000 | 13:00 JANUARY 14, 2000 |
| APPLICATION A | FILE SYSTEM B | 00:00 JANUARY 1, 2000 | 13:00 JANUARY 14, 2000 |
| APPLICATION A | FILE SYSTEM C | 00:00 JANUARY 1, 2000 | 13:00 JANUARY 14, 2000 |
| APPLICATION A | FILE SYSTEM D | 00:00 JANUARY 1, 2000 | 13:00 JANUARY 14, 2000 |
| APPLICATION B | FILE SYSTEM E | 00:00 JANUARY 1, 2000 | 13:00 JANUARY 14, 2000 |
| APPLICATION B | FILE SYSTEM F | 00:00 JANUARY 1, 2000 | 13:00 JANUARY 14, 2000 |
| APPLICATION C | FILE SYSTEM G | 00:00 JANUARY 1, 2000 | 13:00 JANUARY 14, 2000 |
| APPLICATION C | FILE SYSTEM H | 00:00 JANUARY 1, 2000 | 13:00 JANUARY 14, 2000 |

FILE SYSTEM – VOLUME RELATION TABLE —— 1101

| FILE SYSTEM | VOLUME | EFFECTIVE PERIOD START TIME | EFFECTIVE PERIOD END TIME |
|---|---|---|---|
| FILE SYSTEM X | VOLUME X | 00:00 JANUARY 1, 2000 | 12:00 JANUARY 14, 2000 |

FILE SYSTEM – VOLUME RELATION TABLE OF HOST MONITORING AGENT A APPLICATION —— 1801

| FILE SYSTEM | VOLUME | EFFECTIVE PERIOD START TIME | EFFECTIVE PERIOD END TIME |
|---|---|---|---|
| FILE SYSTEM A | VOLUME A | 00:00 JANUARY 1, 2000 | 13:00 JANUARY 14, 2000 |
| FILE SYSTEM B | VOLUME A | 00:00 JANUARY 1, 2000 | 13:00 JANUARY 14, 2000 |
| FILE SYSTEM C | VOLUME B | 00:00 JANUARY 1, 2000 | 13:00 JANUARY 14, 2000 |
| FILE SYSTEM D | VOLUME B | 00:00 JANUARY 1, 2000 | 13:00 JANUARY 14, 2000 |
| FILE SYSTEM E | VOLUME C | 00:00 JANUARY 1, 2000 | 13:00 JANUARY 14, 2000 |
| FILE SYSTEM F | VOLUME C | 00:00 JANUARY 1, 2000 | 13:00 JANUARY 14, 2000 |

FILE SYSTEM – VOLUME RELATION TABLE OF HOST MONITORING AGENT B APPLICATION — 1901

| FILE SYSTEM | VOLUME | EFFECTIVE PERIOD START TIME | EFFECTIVE PERIOD END TIME |
|---|---|---|---|
| FILE SYSTEM G | VOLUME D | 00:00 JANUARY 1, 2000 | 13:00 JANUARY 14, 2000 |
| FILE SYSTEM H | VOLUME D | 00:00 JANUARY 1, 2000 | 13:00 JANUARY 14, 2000 |

FILE SYSTEM-VOLUME RELATION TABLE — 1302

| FILE SYSTEM | VOLUME | EFFECTIVE PERIOD START TIME | EFFECTIVE PERIOD END TIME |
|---|---|---|---|
| FILE SYSTEM A | VOLUME A | 00:00 JANUARY 1, 2000 | 13:00 JANUARY 14, 2000 |
| FILE SYSTEM B | VOLUME A | 00:00 JANUARY 1, 2000 | 13:00 JANUARY 14, 2000 |
| FILE SYSTEM C | VOLUME B | 00:00 JANUARY 1, 2000 | 13:00 JANUARY 14, 2000 |
| FILE SYSTEM D | VOLUME B | 00:00 JANUARY 1, 2000 | 13:00 JANUARY 14, 2000 |
| FILE SYSTEM E | VOLUME C | 00:00 JANUARY 1, 2000 | 13:00 JANUARY 14, 2000 |
| FILE SYSTEM F | VOLUME C | 00:00 JANUARY 1, 2000 | 13:00 JANUARY 14, 2000 |
| FILE SYSTEM G | VOLUME D | 00:00 JANUARY 1, 2000 | 13:00 JANUARY 14, 2000 |
| FILE SYSTEM H | VOLUME D | 00:00 JANUARY 1, 2000 | 13:00 JANUARY 14, 2000 |

VOLUME-LOGICAL VOLUME-RAID GROUP-PORT RELATION TABLE — 1102

| VOLUME | LOGICAL VOLUME | RAID GROUP | HOST-SIDE PORT | STORAGE-SIDE PORT | EFFECTIVE PERIOD START TIME | EFFECTIVE PERIOD END TIME |
|---|---|---|---|---|---|---|
| VOLUME X | LOGICAL VOLUME X | RAID GROUP X | PORT X | PORT Y | 00:00 JANUARY 1, 2000 | 12:00 JANUARY 14, 2000 |

VOLUME-LOGICAL VOLUME-RAID GROUP-PORT RELATION TABLE OF HOST MONITORING AGENT A — 2101

| VOLUME | LOGICAL VOLUME | RAID GROUP | HOST-SIDE PORT | STORAGE-SIDE PORT | EFFECTIVE PERIOD START TIME | EFFECTIVE PERIOD END TIME |
|---|---|---|---|---|---|---|
| VOLUME A | VOLUME A | RAID GROUP A | PORT A | PORT N | 00:00 JANUARY 1, 2000 | 13:00 JANUARY 14, 2000 |
| VOLUME B | VOLUME B | RAID GROUP A | PORT A | PORT N | 00:00 JANUARY 1, 2000 | 13:00 JANUARY 14, 2000 |
| VOLUME C | VOLUME C | RAID GROUP B | PORT A | PORT O | 00:00 JANUARY 1, 2000 | 13:00 JANUARY 14, 2000 |

2102  2103  2104  2105  2106  2107  2108

VOLUME-LOGICAL VOLUME-RAID GROUP-PORT RELATION TABLE OF HOST MONITORING AGENT B ~2201

| VOLUME | LOGICAL VOLUME | RAID GROUP | HOST-SIDE PORT | STORAGE-SIDE PORT | EFFECTIVE PERIOD START TIME | EFFECTIVE PERIOD END TIME |
|---|---|---|---|---|---|---|
| VOLUME D | LOGICAL VOLUME D | RAID GROUP B | PORT B | PORT P | 00:00 JANUARY 1, 2000 | 13:00 JANUARY 14, 2000 |

VOLUME-LOGICAL VOLUME-RAID GROUP-PORT RELATION TABLE ~1303

| VOLUME | LOGICAL VOLUME | RAID GROUP | HOST-SIDE PORT | STORAGE-SIDE PORT | EFFECTIVE PERIOD START TIME | EFFECTIVE PERIOD END TIME |
|---|---|---|---|---|---|---|
| VOLUME A | LOGICAL VOLUME A | RAID GROUP A | PORT A | PORT N | 00:00 JANUARY 1, 2000 | 13:00 JANUARY 14, 2000 |
| VOLUME B | LOGICAL VOLUME B | RAID GROUP A | PORT A | PORT N | 00:00 JANUARY 1, 2000 | 13:00 JANUARY 14, 2000 |
| VOLUME C | LOGICAL VOLUME C | RAID GROUP B | PORT A | PORT O | 00:00 JANUARY 1, 2000 | 13:00 JANUARY 14, 2000 |
| VOLUME D | LOGICAL VOLUME D | RAID GROUP B | PORT B | PORT P | 00:00 JANUARY 1, 2000 | 13:00 JANUARY 14, 2000 |

INTER-PORT COMMUNICATION PATH TABLE — 1201

| HOST-SIDE PORT | STORAGE-SIDE PORT | COMMUNICATION PATH | EFFECTIVE PERIOD START TIME | EFFECTIVE PERIOD END TIME |
|---|---|---|---|---|
| PORT X | PORT Y | {PORT S, PORT T, PORT U, PORT V} | 00:00 JANUARY 1, 2000 | 13:00 JANUARY 14, 2000 |
| 2411 | 2412 | 2413 | 2414 | 2415 |

FIG. 24A

INTER-PORT COMMUNICATION PATH TABLE OF SAN SWITCH MONITORING AGENT — 2401

| HOST-SIDE PORT | STORAGE-SIDE PORT | COMMUNICATION PATH | EFFECTIVE PERIOD START TIME | EFFECTIVE PERIOD END TIME |
|---|---|---|---|---|
| PORT A | PORT N | {PORT C, PORT D, PORT H, PORT I} | 00:00 JANUARY 1, 2000 | 13:00 JANUARY 14, 2000 |
| PORT A | PORT O | {PORT C, PORT E, PORT J, PORT O} | 00:00 JANUARY 1, 2000 | 13:00 JANUARY 14, 2000 |
| PORT B | PORT P | {PORT F, PORT G, PORT K, PORT M} | 00:00 JANUARY 1, 2000 | 13:00 JANUARY 14, 2000 |
| 2402 | 2403 | 2404 | 2405 | 2406 |

FIG. 24B

INTER-PORT COMMUNICATION PATH TABLE — 1304

| HOST-SIDE PORT | STORAGE-SIDE PORT | COMMUNICATION PATH | EFFECTIVE PERIOD START TIME | EFFECTIVE PERIOD END TIME |
|---|---|---|---|---|
| PORT A | PORT N | {PORT C, PORT D, PORT H, PORT I} | 00:00 JANUARY 1, 2000 | 13:00 JANUARY 14, 2000 |
| PORT A | PORT O | {PORT C, PORT E, PORT J, PORT O} | 00:00 JANUARY 1, 2000 | 13:00 JANUARY 14, 2000 |
| PORT B | PORT P | {PORT F, PORT G, PORT K, PORT M} | 00:00 JANUARY 1, 2000 | 13:00 JANUARY 14, 2000 |

*FIG. 25*

APPLICATION PERFORMANCE DETERIORATION PERIOD DETERMINING RULE 132

| APPLICATION NAME | OBJECTIVE TURN-AROUND TIME, (SECONDS) |
|---|---|
| APPLICATION NAME X | 1000 |

2711　　　　　　　　　　　　　　　　　　2712

APPLICATION PERFORMANCE DETERIORATION PERIOD DETERMINING RULE OF APPLICATION MONITORING AGENT A — 2712

| APPLICATION NAME | OBJECTIVE TURN-AROUND TIME, (SECONDS) |
|---|---|
| APPLICATION NAME A | 1800 |

2702　　　　　　　　　　　　　　　　　　2703

APPLICATION PERFORMANCE DETERIORATION PERIOD ⸺ 2801
DETERMINING RULE OF APPLICATION MONITORING AGENT B

| APPLICATION NAME | OBJECTIVE TURN-AROUND TIME, (SECONDS) |
|---|---|
| APPLICATION NAME B | 600 |

APPLICATION PERFORMANCE DETERIORATION PERIOD ⸺ 2901
DETERMINING RULE OF APPLICATION MONITORING AGENT C

| APPLICATION NAME | OBJECTIVE TURN-AROUND TIME, (SECONDS) |
|---|---|
| APPLICATION NAME C | 7200 |

APPLICATION PERFORMANCE DETERIORATION PERIOD TABLE ⟋134

| APPLICATION NAME | PERFORMANCE DETERIORATION START TIME | PERFORMANCE DETERIORATION END TIME |
|---|---|---|
| APPLICATION NAME X | 10:20 JANUARY 1, 2000 | 10:50 JANUARY 1, 2000 |

APPLICATION PERFORMANCE DETERIORATION PERIOD TABLE OF APPLICATION MONITORING AGENT A ⟋3001

| APPLICATION NAME | PERFORMANCE DETERIORATION START TIME | PERFORMANCE DETERIORATION END TIME |
|---|---|---|
| APPLICATION NAME A | 10:30 JANUARY 11, 2000 | 11:10 JANUARY 11, 2000 |
| APPLICATION NAME A | 13:00 JANUARY 11, 2000 | 13:40 JANUARY 11, 2000 |
| : | : | : |

APPLICATION PERFORMANCE DETERIORATION PERIOD — 3101
TABLE OF APPLICATION MONITORING AGENT B

| APPLICATION | PERFORMANCE DETERIORATION START TIME | PERFORMANCE DETERIORATION END TIME |
|---|---|---|
| APPLICATION B | 01:00 JANUARY 14, 2000 | 01:20 JANUARY 14, 2000 |
| APPLICATION B | 12:00 JANUARY 14, 2000 | 12:15 JANUARY 14, 2000 |
| : | : | : |

APPLICATION PERFORMANCE DETERIORATION PERIOD — 3201
TABLE OF APPLICATION MONITORING AGENT C

| APPLICATION | PERFORMANCE DETERIORATION START TIME | PERFORMANCE DETERIORATION END TIME |
|---|---|---|
| APPLICATION C | 10:30 JANUARY 13, 2000 | 13:05 JANUARY 13, 2000 |
| APPLICATION C | 15:00 JANUARY 13, 2000 | 17:55 JANUARY 13, 2000 |
| : | : | : |

APPLICATION PERFORMANCE DETERIORATION PERIOD TABLE /137

| APPLICATION | PERFORMANCE DETERIORATION START TIME | PERFORMANCE DETERIORATION END TIME |
|---|---|---|
| APPLICATION A | 10:30 JANUARY 11, 2000 | 11:10 JANUARY 11, 2000 |
| APPLICATION A | 13:00 JANUARY 11, 2000 | 13:40 JANUARY 11, 2000 |
| : | : | : |
| APPLICATION B | 01:00 JANUARY 14, 2000 | 01:20 JANUARY 14, 2000 |
| APPLICATION B | 12:00 JANUARY 14, 2000 | 12:15 JANUARY 14, 2000 |
| : | : | : |
| APPLICATION C | 10:30 JANUARY 13, 2000 | 13:05 JANUARY 13, 2000 |
| APPLICATION C | 15:00 JANUARY 13, 2000 | 17:55 JANUARY 13, 2000 |
| : | : | : |

DELETION DATA CONTROL CONTROL TABLE —139

| PERFORMANCE DETERIORATION START TIME | PERFORMANCE DETERIORATION END TIME | PERFORMANCE DEPENDENT RESOURCE |
|---|---|---|
| 10:30 JANUARY 11, 2000 | 11:10 JANUARY 11, 2000 | FILE SYSTEM A |
| 10:30 JANUARY 11, 2000 | 11:10 JANUARY 11, 2000 | FILE SYSTEM B |
| 10:30 JANUARY 11, 2000 | 11:10 JANUARY 11, 2000 | FILE SYSTEM C |
| 10:30 JANUARY 11, 2000 | 11:10 JANUARY 11, 2000 | FILE SYSTEM D |
| 10:30 JANUARY 11, 2000 | 11:10 JANUARY 11, 2000 | VOLUME A |
| 10:30 JANUARY 11, 2000 | 11:10 JANUARY 11, 2000 | VOLUME B |
| 10:30 JANUARY 11, 2000 | 11:10 JANUARY 11, 2000 | PORT A |
| 10:30 JANUARY 11, 2000 | 11:10 JANUARY 11, 2000 | PORT C |
| 10:30 JANUARY 11, 2000 | 11:10 JANUARY 11, 2000 | PORT D |
| 10:30 JANUARY 11, 2000 | 11:10 JANUARY 11, 2000 | PORT H |
| 10:30 JANUARY 11, 2000 | 11:10 JANUARY 11, 2000 | PORT I |
| 10:30 JANUARY 11, 2000 | 11:10 JANUARY 11, 2000 | PORT N |
| 10:30 JANUARY 11, 2000 | 11:10 JANUARY 11, 2000 | LOGICAL VOLUME A |
| 10:30 JANUARY 11, 2000 | 11:10 JANUARY 11, 2000 | LOGICAL VOLUME B |
| 10:30 JANUARY 11, 2000 | 11:10 JANUARY 11, 2000 | RAID GROUP A |
| 13:00 JANUARY 11, 2000 | 13:40 JANUARY 11, 2000 | FILE SYSTEM A |
| 13:00 JANUARY 11, 2000 | 13:40 JANUARY 11, 2000 | FILE SYSTEM B |
| 13:00 JANUARY 11, 2000 | 13:40 JANUARY 11, 2000 | FILE SYSTEM C |
| 13:00 JANUARY 11, 2000 | 13:40 JANUARY 11, 2000 | FILE SYSTEM D |
| 13:00 JANUARY 11, 2000 | 13:40 JANUARY 11, 2000 | VOLUME A |
| 13:00 JANUARY 11, 2000 | 13:40 JANUARY 11, 2000 | VOLUME B |
| 13:00 JANUARY 11, 2000 | 13:40 JANUARY 11, 2000 | PORT C |
| 13:00 JANUARY 11, 2000 | 13:40 JANUARY 11, 2000 | PORT D |
| 13:00 JANUARY 11, 2000 | 13:40 JANUARY 11, 2000 | PORT H |
| 13:00 JANUARY 11, 2000 | 13:40 JANUARY 11, 2000 | PORT I |
| 13:00 JANUARY 11, 2000 | 13:40 JANUARY 11, 2000 | PORT N |
| 13:00 JANUARY 11, 2000 | 13:40 JANUARY 11, 2000 | LOGICAL VOLUME A |
| 13:00 JANUARY 11, 2000 | 13:40 JANUARY 11, 2000 | LOGICAL VOLUME B |
| 13:00 JANUARY 11, 2000 | 13:40 JANUARY 11, 2000 | RAID GROUP A |
| ⋮ | ⋮ | ⋮ |
| 3401 | 3402 | 3403 |

FIG. 34

METRICS PRESERVATION PERIOD TABLE — 141

| PRESERVATION PERIOD TYPE | PRESERVATION PERIOD (HOUR) | |
|---|---|---|
| ORDINARY DATA PRESERVATION PERIOD, HOURS | 72 | — 3603 |
| IMPORTANT DATA PRESERVATION PERIOD | 240 | — 3604 |

3601    3602

METHOD OF COLLECTING AND STORING STORAGE NETWORK PERFORMANCE INFORMATION, COMPUTER SYSTEM, AND PROGRAM

CLAIM OF PRIORITY

The present application claims priority from Japanese application P2004-292849 filed on Oct. 5, 2004, the content of which is hereby incorporated by reference into this application.

BACKGROUND

This invention relates to a method of collecting and storing performance information of a hardware device that constitutes a storage network and of software that is run in the hardware device. More specifically, this invention relates to a method of collecting and storing storage network performance information that is suitable for a large-scale network composed of numerous components from which performance information is to be collected.

Storage networks (Storage Area Networks) structured such that plural host servers access integrated storage systems via a network are spreading widely as architecture for a data center that is capable of enhancing the utilization efficiency of storage which is ever increasing in scale and capable of cutting management cost. For performance monitoring and tuning of a business system in such a storage network environment (hereinafter referred to as SAN environment), it is necessary to comprehensively collect performance information on various hardware devices that constitute the network and on software programs and to recognize the relations between the hardware devices, between the software programs, or between the hardware devices and the software programs as well as their changes with time.

In an SAN environment, plural computers share a network device, a storage system, and other devices unlike conventional architecture where each business system is built, independently of other business systems, on a server to which a computer and an external storage system are directly connected. There is a possibility, in a shared part of the SAN, of interference on performance between business systems executed in the respective computers. This necessitates a comprehensive gathering of performance information, from which the relations between computers, network devices, and storage systems as well as a change with time of device performance are to be obtained.

Conventional performance management software designed for SANs meets this requirement by being constituted of an agent, which is posted in a network for each hardware device and software to be monitored for their performance, and management software (storage management software), which manages performance information of the whole network.

The agents directly communicate with their respective monitor subjects to obtain performance information whereas the management software collects and stores the performance information obtained by the agents to provide the performance information upon request from a storage network manager or the like.

As storage integration based on SAN becomes popular, a large-scale network often has a huge number of components (resources) and the relations between the resources are likely to be complicated. An increase in number and complexity of resources makes performance information to be kept by the storage management software sizable. In order to store performance information efficiently with a limited storage capacity of the storage system, the storage management software employs the following methods:

Method 1, in which collected performance information is stored only for a certain period specified by a storage manager and is deleted after the period passes.

Method 2, in which a limit is set to the storage capacity and older performance information is deleted each time the limit is exceeded.

Method 3, in which collected performance information of fine granularity is arranged into time-series data of less fine granularity, and the coarser the performance information is, the longer the preservation period is set. For instance, performance information is collected every minute for an hour (60 times in total), and the average and other statistical information of the collected data are calculated to obtain hourly performance information. The hourly performance information, which is coarser in granularity than the performance information collected every minute, is stored for a long period. The term "granularity" refers to the number of performance information samples taken per unit time, and a large sample number per unit time means a fine granularity whereas a small sample number per unit time means a coarse granularity.

An example of applying this Method 3 to network traffic data is found in U.S. Pat. No. 5,231,593 B.

SUMMARY

In the case where the performance of an application that executes I/O to and from a SAN deteriorates, the manager of the SAN needs to find the cause of the performance deterioration. The search for the cause of the performance deterioration involves looking over performance information, of the performance information stored by the storage management software, of devices that have participated in execution of an I/O command issued by the application around the time of the performance deterioration of the application, and the performance information of these devices has to be of fine granularity in order for the manager to find out the cause.

Sometimes it is not before several days have passed from occurrence of application performance deterioration that the SAN manager is informed of the occurrence and starts searching for the cause of the performance deterioration. In such cases, whichever of Methods 1 through 3 is employed, performance information of fine granularity could have been deleted by the time the manager starts searching and the cause of the performance deterioration can no longer be tracked down.

It is therefore an object of this invention to provide a method of collecting and storing storage network performance information that makes sure that the cause of application performance deterioration is trackable.

In this invention, whether or not performance information collected, to be stored, from components of a storage network including a computer and a storage system has a possibility of ever being used in a search for the cause of application performance deterioration is automatically judged, and the degree of importance of performance information is determined based on the result of the judgment. The preservation period of performance information that is high in degree of importance is set long whereas a short preservation period is set to performance information of low degree of importance. After the preservation period set to the respective performance information expires, the corresponding performance information is deleted.

This invention is thus capable of automatically narrowing down performance information that is needed in a search for the cause of deterioration in performance of an application that executes I/O to and from a storage network, and storing only the narrowed-down performance information for a given period of time. In short, this invention makes a search for the cause of performance deterioration possible without fail while avoiding expanding the data storage capacity to store performance information by storing only performance information that is necessary to the search for a long period of time.

BRIEF DESCRIPTION OF THE DRAWINGS

FIGS. 4A and 4B are respectively a diagram showing an example of the configuration of metrics value tables that device monitoring agents and the storage network performance management software have, and a diagram showing an example of the contents of a metrics value table a host monitoring agent A has.

FIG. 5 is an explanatory diagram showing an example of the contents of a metrics value table a host monitoring agent B has.

FIG. 6 is an explanatory diagram showing an example of the contents of a metrics value table a storage subsystem monitoring agent has.

FIG. 7 is an explanatory diagram showing an example of the contents of a metrics value table a SAN switch monitoring agent has.

FIG. 8 is an explanatory diagram showing an example of the contents of a metrics value table the storage network performance management software has.

FIG. 14A is an explanatory diagram showing an example of the configuration of application-file system relation tables that application monitoring agents and the storage network performance management software have, and FIG. 14B is an explanatory diagram showing an example of the contents of an application-file system relation table an application monitoring agent A has.

FIG. 15 is an explanatory diagram showing an example of the contents of an application-file system relation table an application monitoring agent B has.

FIG. 16 is an explanatory diagram showing an example of the contents of an application-file system relation table an application monitoring agent C has.

FIG. 17 is an explanatory diagram showing an example of the contents of an application-file system relation table the storage network performance management software has.

FIG. 18A is an explanatory diagram showing an example of the configuration of file system-volume relation tables that the host monitoring agents and the storage network performance management software have, and FIG. 18B is an explanatory diagram showing an example of the contents of a file system-volume relation table the host monitoring agent A has.

FIG. 19 is an explanatory diagram showing an example of the contents of a file system-volume relation table the host monitoring agent B has.

FIG. 20 is an explanatory diagram showing an example of the contents of a file system-volume relation table the storage network performance management software has.

FIG. 21A is an explanatory diagram showing an example of the configuration of volume-logical volume-RAID group-port relation tables that the host monitoring agents and the storage network performance management software have, and FIG. 21B is an explanatory diagram showing an example of the contents of a volume-logical volume-RAID group-port relation table the host monitoring agent A has.

FIG. 22 is an explanatory diagram showing an example of the contents of a volume-logical volume-RAID group-port relation table the host monitoring agent B has.

FIG. 23 is an explanatory diagram showing an example of the contents of a volume-logical volume-RAID group-port relation table the storage network performance management software has.

FIG. 24A is an explanatory diagram showing an example of the configuration of inter-port communication path tables that the SAN switch monitoring agent and the storage network performance management software have, and FIG. 24B is an explanatory diagram showing an example of the contents of an inter-port communication path table the SAN switch monitoring agent has.

FIG. 25 is an explanatory diagram showing an example of the contents of an inter-port communication path table the storage network performance management software has.

FIG. 28 is an explanatory diagram showing an example of application performance deterioration period determining rules the application monitoring agent B has.

FIG. 29 is an explanatory diagram showing an example of application performance deterioration period determining rules the application monitoring agent C has.

FIG. 30A is an explanatory diagram showing an example of the configuration of application performance deterioration period tables that the application monitoring agents and the storage network performance management software have, and FIG. 30B is an explanatory diagram showing an example of the contents of an application performance deterioration period table the application monitoring agent A has.

FIG. 31 is an explanatory diagram showing an example of the contents of an application performance deterioration period table the application monitoring agent B has.

FIG. 32 is an explanatory diagram showing an example of the contents of an application performance deterioration period table the application monitoring agent C has.

FIG. 33 is an explanatory diagram showing an example of the contents of an application performance deterioration period table the storage network performance management software has.

FIG. 34 is an explanatory diagram showing an example of the configuration and contents of a table the storage network performance management software has to control metrics deletion.

DETAILED DESCRIPTION OF THE PREFERRED EMBODIMENTS

An embodiment of this invention will be described below with reference to the accompanying drawings.

Figure 1:
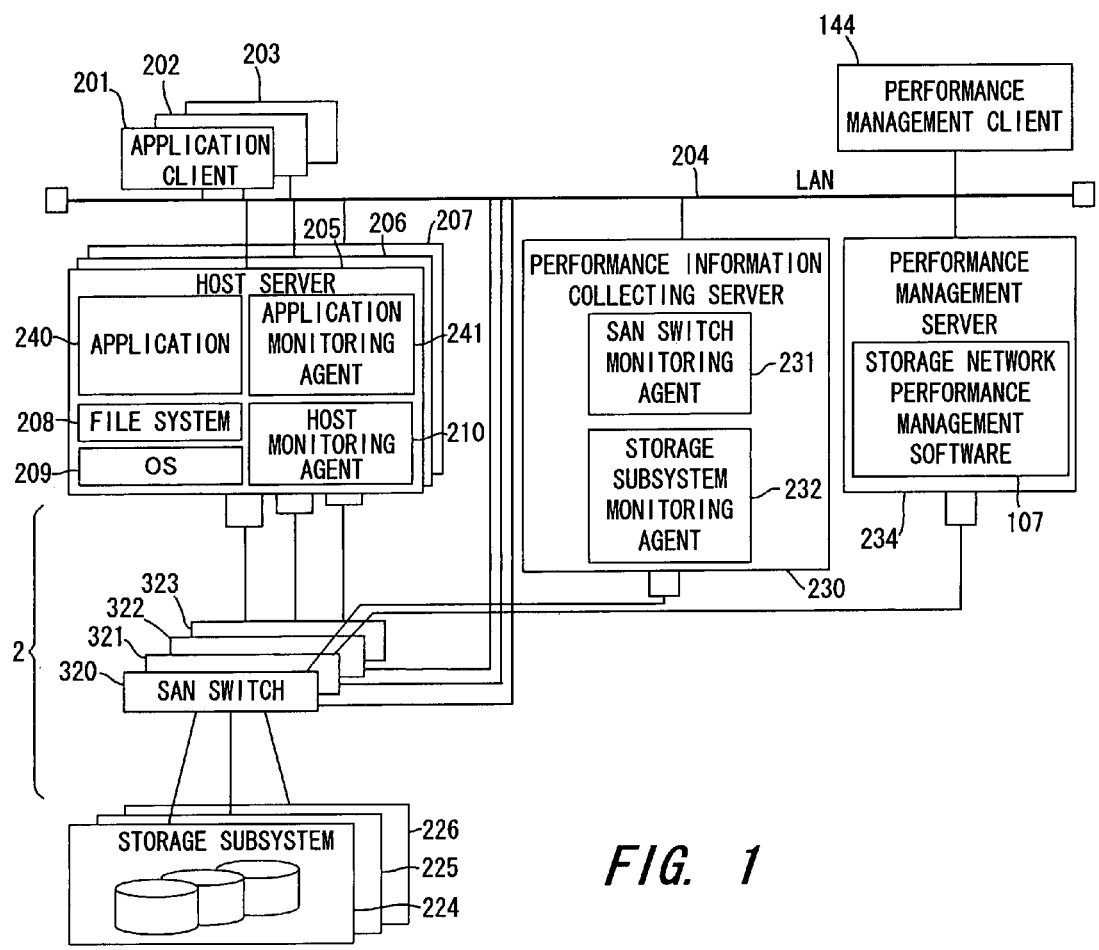
FIG. 1 is a system configuration diagram showing an embodiment of this invention.

FIG. 1 is a diagram of a system configuration to which this invention is applied. Host servers 205 to 207 and application clients 201 to 203 are connected to a local area network (LAN) 204. The application clients 201 to 203 receive services (are served with business operations) of applications 240, which are executed on the respective host servers 205 to 207.

The host servers 205 to 207 are connected via a storage network (SAN) 2 to storage subsystems 224 to 226, to read and write data or the like. The SAN 2 is a fiber channel, for example, and has plural SAN switches 320 to 323 connected to the host servers 205 to 207 and to the storage subsystems 224 to 226. Setting of the SAN switches 320 to 323 is conducted by a not-shown server which is connected for SAN management to the LAN 204. Accordingly, the LAN 204 is connected also to the SAN switches 320 to 323.

Other components connected to the LAN 204 include a performance information collecting server 230, which collects performance information of the SAN 2 and of the storage subsystems 224 to 226, a performance information management server 234, which manages performance information collected by the performance information collecting server 230 and performance information collected by monitoring agents of the host servers as will be described later, and a performance management client 144, through which the performance management server 234 is manipulated.

The performance information collecting server 230 is connected also to the SAN switches 320 to 323 in order to monitor the performance of the SAN 2 and of the storage subsystems 224 to 226. The performance management server 234 may have a port to connect with one of the SAN switches 320 to 323 of the SAN 2 in addition to a port to connect with the LAN 204. The port enables the performance management server 234 to access the storage subsystems 224 to 226.

Described next is the outline of a performance management system that monitors the host servers 205 to 207 and the storage subsystems 224 to 226, which are connected to each other vial the SAN 2, to monitor and collect their performance information.

The host servers 205 to 207 in FIG. 1 each have their respective OSs 209, file systems 208, and applications 240 running therein as well as host monitoring agents 210, which monitor the host servers 205 to 207 to collect their performance information, and application monitoring agents 241, which monitor the applications 240 to collect its performance information.

The host monitoring agents 210 are executed on the host servers 205 to 207 and monitor the host servers 205 to 207 to collect their performance information. The host monitoring agents 210 store the collected performance information in preset areas of the storage subsystems 224 to 226. Through communications with the performance management server 234, the host monitoring agents 210 provide the obtained performance information to SAN performance management software 107 of the performance management server 234 as will be described later.

The host monitoring agents 210 monitors, for example, the I/O count of the file system 208 in each of the host servers 205 to 207, the I/O count of volumes allotted to the respective host servers 205 to 207, the I/O count of ports provided in the respective host servers 205 to 207 for communications with the SAN 2, or the like. The host monitoring agents 210 collect such performance information and store the collected performance information in given areas of the storage subsystem.

The application monitoring agents 241 monitor the applications 240 in the respective host servers 205 to 207 to collect their performance information, and are executed separately from one another.

The application monitoring agents 241 store the collected performance information in preset areas of the storage subsystems 224 to 226. Through communications with the performance management server 234, the application monitoring agents 241 provide the obtained performance information to the SAN performance management software 107.

The application monitoring agents 241 monitor, for example, the response time (turn-around time) of each of the applications 240. The response time to be monitored is counted from reception of requests from the application clients 201 to 203 until the requests are met.

In the case where the response time exceeds a preset value, the application monitoring agents 241, as will be described later, judge whether the performance of the applications 240 has deteriorated or not and detect a period during which the performance has deteriorated. Then the application monitoring agents 241 store the period during which the performance of the applications 240 has deteriorated in preset areas of the storage subsystems 224 to 226. The stored performance information is provided to the performance management server 234 by the application monitoring agents 241 through communications between the server 234 and the agents 241.

A SAN switch monitoring agent 231, which monitors the SAN switches 320 to 323 of the SAN 2 to collect their performance information, and a storage subsystem monitoring agent 232, which monitors the storage subsystems 224 to 226 to collect their performance information, are run in the performance information collecting server 230.

The SAN switch monitoring agent 231 monitors the SAN switches 320 to 323 to collect their performance information.

The SAN switch monitoring agent 231 stores the collected performance information in preset areas of the storage subsystems 224 to 226. Through communications with the performance management server 234, the SAN switch monitoring agent 231 provides the obtained performance information to the SAN performance management software 107.

The SAN switch monitoring agent 231 monitors, for example, the I/O count per unit time of each of the SAN switches 320 to 323. The SAN switch monitoring agent 231 collects such performance information and stores the collected performance information in a given area of the storage subsystem.

The storage subsystem monitoring agent 232 monitors the respective storage subsystems 224 to 226 to collect their performance information.

The storage subsystem monitoring agent 232 stores the collected performance information in preset areas of the storage subsystems 224 to 226. Through communications with the performance management server 234, the storage subsystem monitoring agent 232 provides the obtained performance information to the SAN performance management software 107.

The storage subsystem monitoring agent 232 monitors, for example, the I/O count per unit time of each storage subsystem. More specifically, the I/O count is constituted of the I/O count per unit time of a port in each storage subsystem, the I/O count per unit time of each volume (logical volume), the I/O count per unit time of each RAID group, and the like.

The storage network (SAN) performance management software 107, which manages performance information collected by the above agents, is executed on the performance management server 234.

Figure 41:
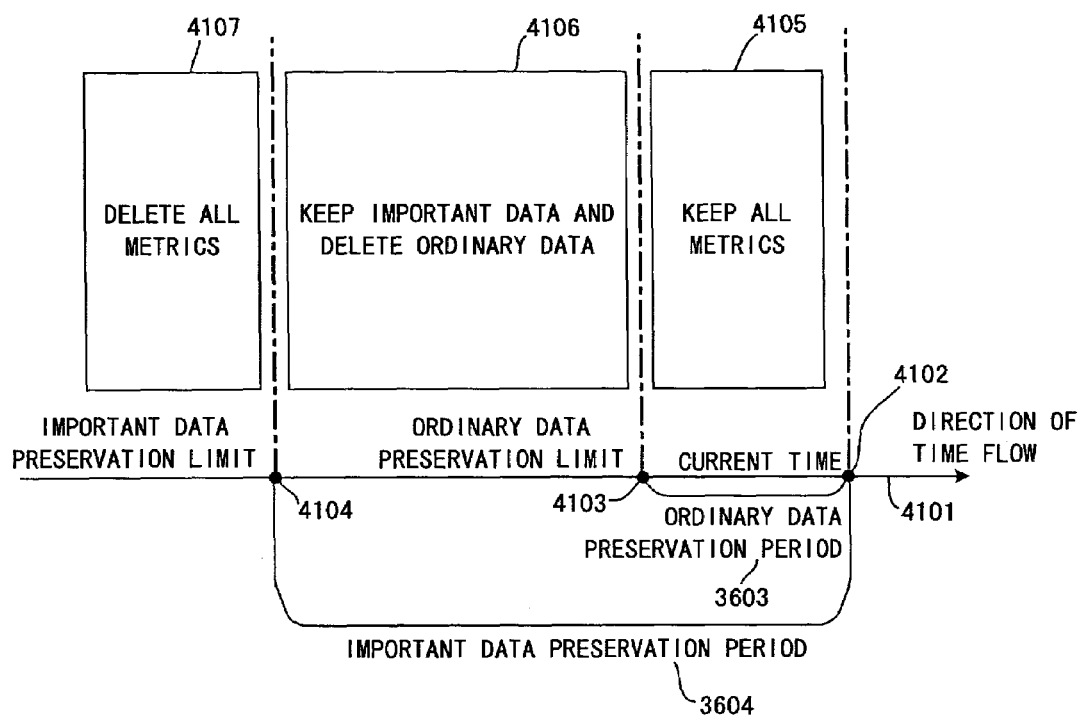
FIG. 41 is an explanatory diagram showing which type of metrics is stored for which data preservation period.

In the case where the application monitoring agents 241 detect performance deterioration of the applications 240, the SAN performance management software 107 labels performance information of a resource on the SAN 2 that is related to the application 240 as important data and prolongs the preservation period of this performance information in the period during which the performance of the applications 240 has deteriorated as shown in FIG. 41, which will be described later.

On the other hand, performance information of a resource that is not concerned with performance deterioration is treated as ordinary data to which a given preservation period is set.

Once the preservation period (the normal preservation period for ordinary data or the prolonged preservation period for important data) passes, the stored performance information is deleted.

To summarize, this performance management system recognizes a failure or wrong setting on the SAN 2 from performance information (response time) of the applications 240, labels, as important data, performance information of a resource on the SAN 2 that is related to an I/O path (path information) used by one of the applications 240 whose performance has deteriorated, and sets the preservation period of this performance information longer than the normal preservation period as will be described below to make tracking the failure or the like at a later time possible.

On the other hand, performance information of a resource on the SAN 2 that is not concerned with the performance deterioration of the one of the applications 240 is stored for the normal preservation period which is shorter than the important data preservation period, and is deleted after the normal preservation period elapses.

Thus performance information of fine granularity is kept, past expiration of the ordinary data preservation period, for a resource that is related to the I/O path of one of the applications 240 whose performance has deteriorated. The cause of performance deterioration of the one of the applications 240 can therefore be tracked while avoiding expanding the storage area to store performance information.

Figure 2:
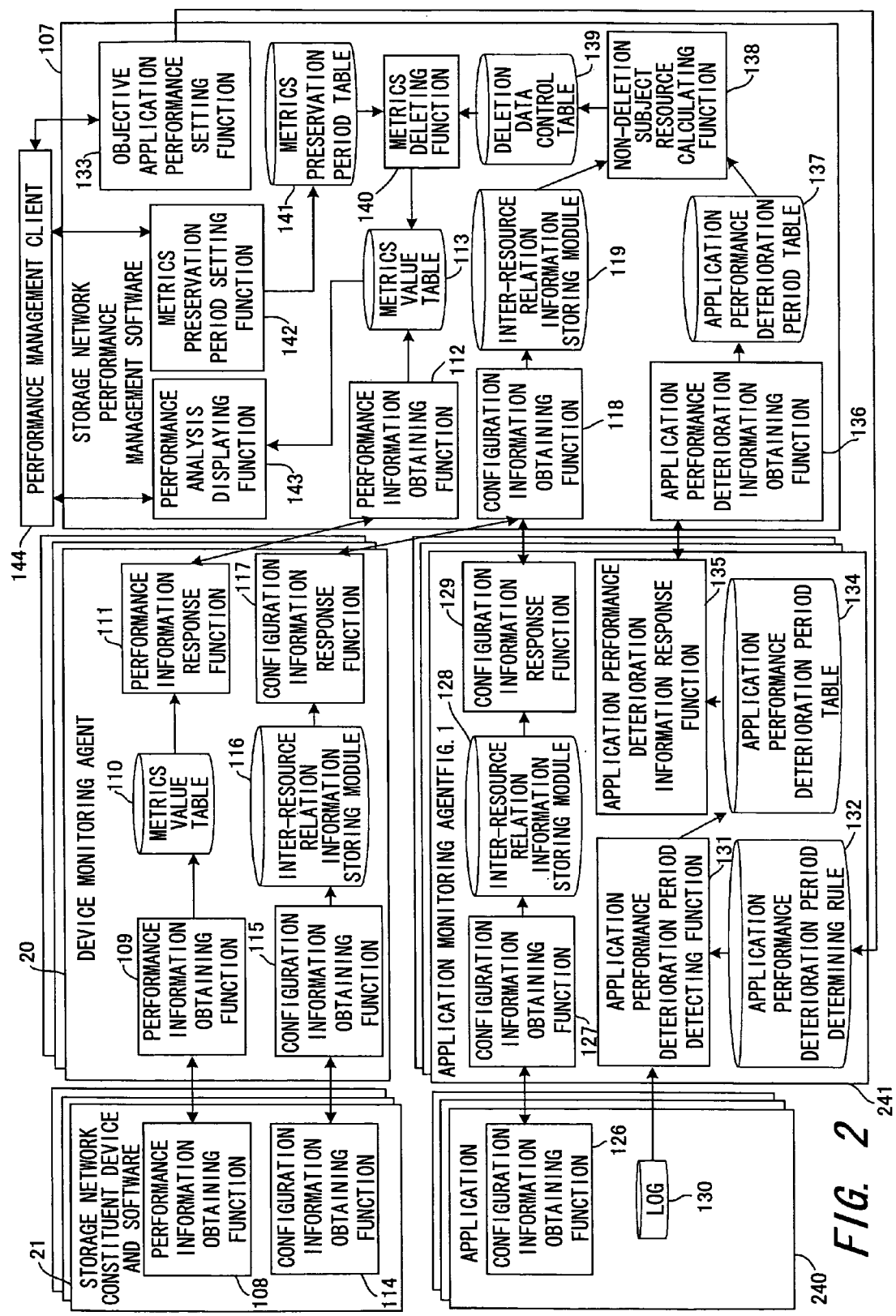
FIG. 2 is a function block diagram of performance management software according to this invention.

FIG. 2 is an explanatory diagram outlining functions of the performance management system shown in FIG. 1. In FIG. 2, each storage network constituent device/software represents one of the following resources shown in FIG. 1: the SAN 2, the storage subsystems 224 to 226, and the hardware, OSs, file systems, and other resources in the host servers 205 to 207 that are related to the SAN 2.

The term device management agent (denoted by 20) is a collective name for the SAN switch monitoring agent 231, storage subsystem monitoring agent 232, and host monitoring agents 210 of FIG. 1. The device management agents 20 monitor resources on the SAN 2 to collect and store their performance information.

Each storage network constituent device/software has a performance information obtaining function 108, which is for obtaining performance information of its associated resource on the SAN 2, and a configuration information obtaining function 114, which is for obtaining configuration information of the resource.

Each device monitoring agent 20 has a performance information obtaining function 109, which is for collecting performance information of its associated resource on the SAN 2, a metrics value table 110, which is for converting the collected performance information into metrics values, a performance information response function 111, which is for notifying the SAN performance management software 107 of performance information (metrics values) and the like, a configuration information obtaining function 115, which is for obtaining configuration information from the associated resource on the SAN 2, an inter-resource relation information storing module 116, which stores the relation between resources on the SAN 2 based on I/O paths of the applications 240, and a configuration information response function 117, which is for sending the obtained configuration information to the SAN performance management software 107 in response.

The applications 240 executed in the respective host servers 205 to 207 each has a configuration information obtaining function 126, which is for obtaining the configuration information of a resource on the SAN 2 the application 240 uses. Performance information (response time) of the respective applications 240 is outputted to a log 130.

The application monitoring agents 241 each have a configuration information obtaining function 127, which is for collecting configuration information of resources on the SAN 2 that are used by the applications 240, an inter-resource relation information storing module 128, which stores the relation between the resources on the SAN 2 that are used by the applications 240, a configuration information response function 129, which is for sending the configuration information obtained by the configuration information obtaining function 127 to the SAN performance management software 107 in response, an application performance deterioration period detecting function 131, which is for detecting performance deterioration of the applications 240 by reading the log 130, an application performance deterioration period determining rule 132, which is information used to judge whether or not performance of the applications 240 has deteriorated, an application performance deterioration period table 134, which stores the period in which deterioration is detected as a performance deterioration period, and an application performance deterioration information response function 135, which is for sending information in the application performance deterioration period table 134 to the SAN performance management software 107 in response.

The SAN performance management software 107 has a performance information obtaining function 112, which is for collecting performance information of resources on the SAN 2 from the device monitoring agents 20, a metrics value table 113, which stores metrics values collected as performance information, a configuration information obtaining function 118, which is for collecting configuration information of the resources on the SAN 2, an inter-resource relation information storing module 119, which stores the relation between the resources on the SAN 2, an application performance deterioration information obtaining function 136, which is for collecting information on performance deterioration from the application monitoring agents 241, an application performance deterioration period table 137, which stores a performance deterioration period for each application, a non-deletion subject resource calculating function 138 and a deletion data control table 139, which are for discriminating important data from ordinary data to prolong the preservation period of performance information that is related to application performance deterioration, a metrics deleting function 140, which is for deleting metrics values (performance information) that have passed their preservation period from given areas of the storage subsystems 224 to 226, a metrics preservation period table 141, in which the preservation period of a metrics value is set for each resource on the SAN 2, an objective application performance setting function 133, which is for setting a target value to judge whether performance of the applications 240 has deteriorated or not, a metrics preservation period setting function 142, which is for setting the preservation period of a metrics value collected as performance information, and a performance analysis displaying function 143, which is for displaying performance analysis based on metrics values of the resources on the SAN 2.

The application monitoring agents 241 are software executed on the respective host servers 205 to 207 to detect performance deterioration of the applications 240 which are run in the respective host servers 205 to 207. The application monitoring agents 241 also detect the association relation of applications 204, and the application 240 uses which file system 208.

Performance information is collected and monitored on the SAN 2 as follows:

The performance information obtaining function 109 of the device monitoring agents 20 is periodically activated by a timer following a preset schedule, or activated upon request from the SAN performance management software 107. In the device monitoring agent whose performance information obtaining function 109 is activated, the performance information obtaining function 109 requests a measured metrics value from the performance information obtaining function 108 of one of the storage network constituent devices/software 21 that is monitored by this device monitoring agent. The term "metrics" refers to, of performance information of the respective storage network components (resources), those that are candidates of performance deterioration information. The metrics is a converted form of collected performance information. For instance, different types of performance information are converted into metrics values in order to make comparison possible.

The metric value sent by the performance information obtaining function 108 of resources on the SAN 2 in response to the request of this device monitoring agent is stored in the metrics value table 110 by the performance information obtaining function 109 of this device monitoring agent 20.

Similarly, the performance information obtaining function 112 of the SAN performance management software 107 is periodically activated by a timer following a preset schedule and requests the performance information response function 111 of the device monitoring agents 20 to send a metrics value. Receiving the request, the device monitoring agents 20 look up the metrics value table 110 for the requested metrics value and send the retrieved metrics value to the performance information obtaining function 112 of the SAN performance management software 107. The SAN performance management software 107 uses the performance information obtaining function 112 to store the metrics value sent by the performance information response function 111 of the device monitoring agents 20 in the metrics value table 113.

Figure 9:
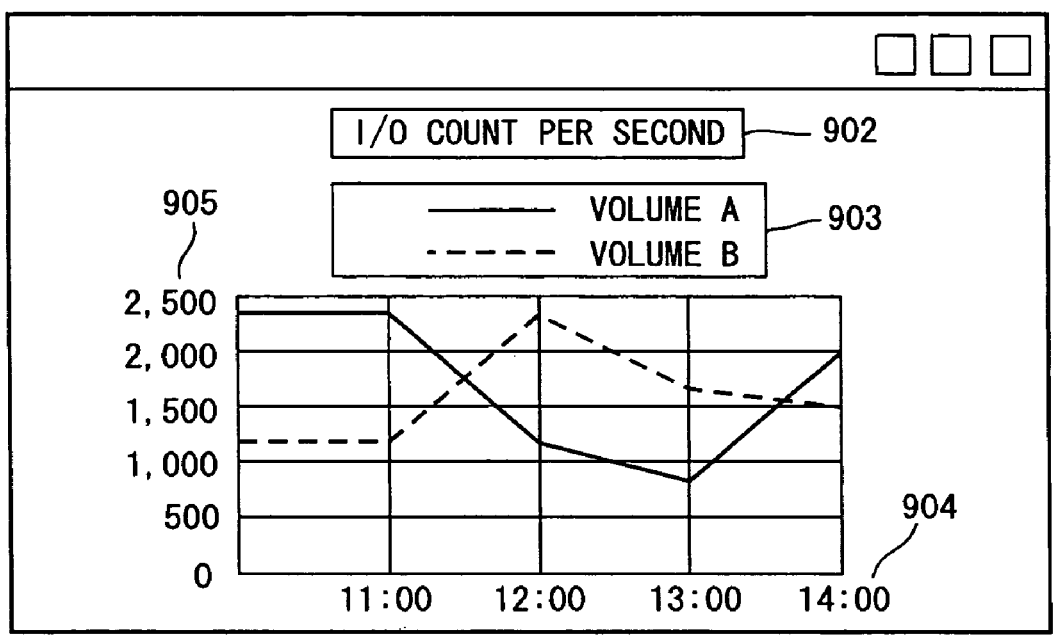
FIG. 9 is an explanatory diagram showing an example of a screen on which performance analysis information is displayed in a graph format.

Of components of the SAN 2, one that forms a unit for obtaining a group of metrics values is called a resource. The relation between one resource and another resource will be described later with reference to FIG. 3. FIG. 9 illustrates a specific example of a screen displayed on the performance management client 144 by the performance analysis displaying function 143 of the SAN performance management software 107.

Inter-resource relation information is collected the same way as performance information, and specifics thereof are given below:

The configuration information obtaining function 115 of the device monitoring agents 20 is periodically activated following a preset schedule, or activated upon request from the SAN performance management software 107. In the device monitoring agent whose configuration information obtaining function 115 is activated, the configuration information obtaining function 115 requests inter-resource relation information from the configuration information obtaining function 114 of one of the storage network constituent devices/software 21 that is monitored by this device monitoring agent. The requested inter-resource relation information, which is based on inter-resource configuration information, is sent to be stored in the inter-resource relation information storing module 116.

The configuration information obtaining function 118 of the SAN performance management software 107 is periodically activated following a preset schedule, and requests the configuration information response function 117 of the device monitoring agents 20 to send inter-resource relation information collected by the agents 20. The requested information is retrieved from the inter-resource relation information storing module 116 in each of the device monitoring agents 20, and sent to be stored in the inter-resource relation information storing module 119.

Inter-resource relation information from the application monitoring agents 241 is collected in a similar manner. The configuration information obtaining function 127 of the application monitoring agents 241 is periodically activated following a preset schedule, or activated upon request from the SAN performance management software 107. In the application monitoring agent whose configuration information obtaining function 127 is activated, the configuration information obtaining function 127 requests inter-resource relation information from the configuration information obtaining function 126 of one of the applications 240 that is monitored by this application monitoring agent. Receiving the requested inter-resource relation information, the application monitoring agent 241 stores the information in the inter-resource relation information storing module 128.

The configuration information obtaining function 118 of the SAN performance management software 107 requests the configuration information response function 129 of the application monitoring agents 241 to send inter-resource relation information collected by the agents 241. The requested information is retrieved from the inter-resource relation information storing module 128 in each of the application monitoring agents 241, and sent to be stored in the inter-resource relation information storing module 119 of the SAN performance management software 107.

Upon request from the performance management client 144, the performance analysis displaying function 143 of the SAN performance management software 107 looks up the metrics value table 113 for a metrics value and sends the requested metrics value to the client 144. The performance analysis displaying function 143 sometimes uses the relation between network components in order to meet a performance analysis request from the performance management client 144, and relevant information in this case is retrieved from the inter-resource relation information storing module 119.

The application monitoring agents 241 detect and store performance deterioration periods of the applications 240 as follows:

The application performance deterioration period detecting function 131 of the application monitoring agents 241 is periodically activated following a preset schedule, or activated upon request from the SAN performance management software 107. In the application monitoring agent whose application performance deterioration period detecting function 131 is activated, the application performance deterioration period detecting function 131 collects the log 130 of one of the applications 240 that is monitored by this application monitoring agent.

The applications 240 write information necessary for performance deterioration detection in their logs. The application performance deterioration period detecting function 131 of the application monitoring agents 241 reads the log 130 for analysis, detects performance deterioration periods of the applications 240 based on the application performance deterioration period determining rule 132, and writes the detected performance deterioration periods in the application performance deterioration period table 134. The application performance deterioration period determining rule 132 is set by the objective application performance setting function 133 of the SAN performance management software 107. The objective application performance setting function 133 is manipulated through the performance management client 144. The application performance deterioration information obtaining function 136 of the SAN performance management software 107 is periodically activated following a preset schedule, and requests the application performance deterioration information response function 129 of the device monitoring agents 20 to send application performance deterioration periods detected by the agents 20. The requested information is retrieved from the application performance deterioration period table 134, and sent to be stored in the application performance deterioration period table 137.

Details of the objective application performance setting function 133 of the SAN performance management software 107 will be described with reference to FIG. 35. Details of the application performance deterioration period detecting function 131 will be described with reference to FIG. 37.

Metrics values collected by the SAN performance management software 107 are deleted as follows:

First, the non-deletion subject resource calculating function 138 of the SAN performance management software 107 looks up the application performance deterioration period table 137 to obtain a performance deterioration period of one of the applications 240. Then the non-deletion subject resource calculating function 138 consults the inter-resource relation information storing module 119 to detect resources that have interacted with this application during the obtained performance deterioration period, and stores the detected resources in the deletion data control table 139.

Next, the metrics deleting function 140 of the SAN performance management software 107 deletes a metrics value from the metrics value table 113 according to the deletion data control table 139. Upon deletion, the metrics preservation period table 141 is consulted to obtain a metrics preservation period. Values in the metrics preservation period table 141 are set by the metrics preservation period setting function 142. The metrics preservation period setting function 142 is manipulated through the performance management client 144.

Details of the non-deletion subject resource calculating function 138 will be described with reference to FIGS. 38, 39, and 40. Details of the metrics deleting function 140 will be described with reference to FIGS. 41 and 42.

Figure 3:
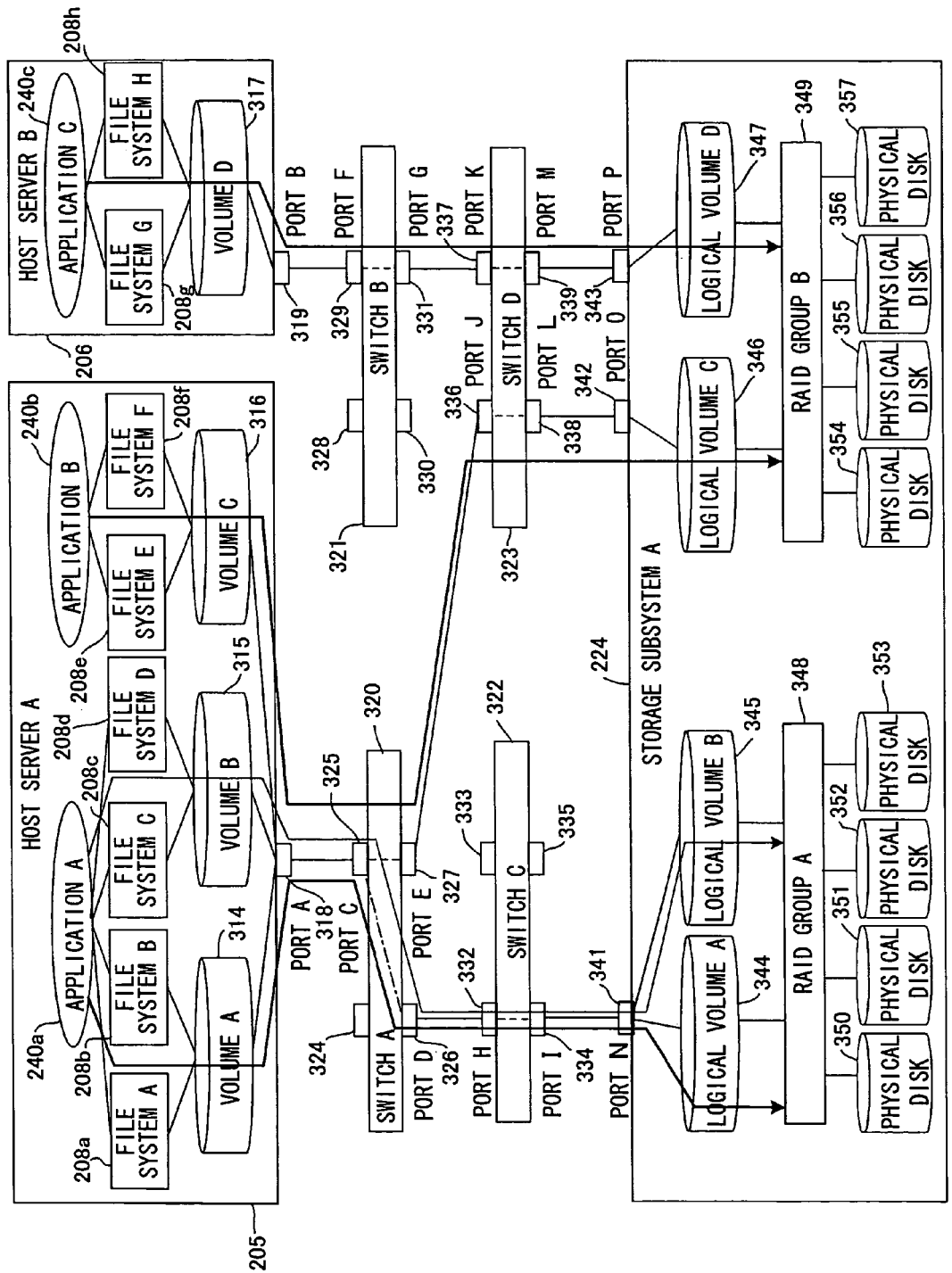
FIG. 3 is an explanatory diagram showing how a representative host server, SAN switch, and storage subsystem in the configuration diagram of FIG. 1 communicate.

FIG. 3 is an explanatory diagram of software and hardware to show specific examples of resources and the dependence relation in terms of performance between resources. Various resources are provided for hardware devices and software that constitute the storage network. The resources in the storage network influence one another's performance.

In FIG. 3, a host server A corresponds to the host server 205 of FIG. 1 and a host server B corresponds to the host server 206 of FIG. 1. The host servers A and B in this example access a storage subsystem A (the storage subsystem 224 of FIG. 1) through the SAN switches 320 to 323, which constitute the SAN 2.

The host server A has, on the SAN 2 side, a port A (318) which is connected to a port N (341) of the storage subsystem A through a port C (325) and port D (326) of the SAN switch 320 and through a port H (332) and port I (334) of the SAN switch 322. The port A is also connected to a port O (342) of the storage subsystem A through the port C (325) and a port E (327) of the SAN switch 320 and through a port J (336) and port L (338) of the SAN switch 323.

The host server B has, on the SAN 2 side, a port B (319) which is connected to a port P (343) of the storage subsystem A through a port F (329) and port G (331) of the SAN switch 321 and through a port K (337) and port M (339) of the SAN switch 323. Of ports of the SAN switches 320 to 323 in FIG.

3, the ports located on the side of the host servers A and B are called host-side ports whereas ports located on the side of the storage subsystem 224 are called storage-side ports.

An application A (240a) and an application B (240b) are run in the host server A (205). The host server A (205) has a file system A (208a) to a file system F (208f) and a volume A (314) to a volume C (316).

The volume A (314) is a virtual disk mounted to the OS of the host server A in order to enable the host server A to issue an I/O command to a logical volume A (344) of the storage subsystem A which will be described later. The same applies to the volumes B (315) and C (316), which are virtual disks obtained by mounting logical volumes B (345) and C (346) of the storage subsystem A to the host server A, respectively.

An application C (240c) is run in the host server B (206) as in the host server A. The host server B (206) has a file system G (208g), a file system H (208h) and a volume D (317).

The SAN switch A (320) has the ports (324) to (327). Of the ports the SAN switch A has, the one numbered as 325 is the port C, the one numbered as 326 is the port D, and the one numbered as 327 is the port E.

Similarly, the SAN switch B (321) has the ports (328) to (331), the SAN switch C (322) has the ports (332) to (335), and the SAN switch D (323) has the ports (336) to (339). The ports numbered as 329, 331, 332, 334, 336, 337, 338, and 339 are the ports F, G, H, I, J, K, L, and M, respectively.

The storage subsystem A has physical disks 350 to 357. The physical disks 350 to 353 are arranged into a RAID configuration virtual disk to obtain a RAID group A (348). The physical disks 354 to 357 are arranged into a RAID configuration virtual disk to obtain a RAID group B (349). The RAID group A (348) is cut into slices having a size manageable to the upper server. The resultant slices are the logical volume A (344) and the logical volume B (345). The RAID group B (349) is similarly cut into slices to obtain the logical volume C (346) and a logical volume D (347).

As in FIG. 1, one of the application monitoring agents 241, which detect application performance deterioration and which monitor configuration information, and one of the host monitoring agents 210 that obtains performance information of the hardware and OS of the host server A are run in the server A. The file system A (208a) to the file system F (208f), the volume A (314) to the volume C (316), and the port A (318) are examples of resources whose performance information is to be obtained by one of the host monitoring agents 210 that is run in the host server A (205). The file systems A to H each constitute one unit for data input output management by the OSs 209 of the host servers A and B, and the volumes A to D are managed by the OSs 209 as areas where files created in the file systems are stored in the mounted external storage system.

Lines drawn between resources in FIG. 3 indicate the performance dependence relation. In the example of FIG. 3, the application A (240a) performs I/O processing on the file system A (208a) to the file system D (208d). During the I/O processing, the application A (240a) applies the I/O load to the file system A (208a) to the file system D (208d), meaning that the application A (240a) is in a dependence relation with the file system A (208a) to the file system D (208d) in terms of performance load. The term performance dependence relation refers to a connection relation with a series of devices and software that process an I/O command issued by the applications 240.

The lines in FIG. 3 that connect the file systems A and B with the volume A represent a relation that places the file systems A and B above the volume A. This relation is also a dependence relation in terms of performance load in which manipulation of the file system A and the file system B by the application 240a leads to manipulation of the volume A. Similarly, the lines in FIG. 3 that connect the port A of the host server A with the volume A to the volume C represent a performance dependence relation.

The host server B too has one of the application monitoring agents 241 and one of the host monitoring agents 210 running therein. Resources whose performance information is to be obtained by one of the host monitoring agents 210 that monitors the host server B include the file system G (208g) to the file system H (208h), the volume D (317), and the port B (319).

The SAN switch monitoring agent 231 is performance information collecting software which obtains performance information of the SAN switch A to the SAN switch D. Resources whose performance information is to be obtained by the SAN switch monitoring agent 231 are the ports (324, 325, 326, and 327) of the SAN switch A, the ports (328, 329, 330, and 331) of the SAN switch B, the ports (332, 333, 334, and 335) of the SAN switch C, and the ports (336, 337, 338, and 339) of the SAN switch D.

The storage subsystem monitoring agent 232 is run in the storage subsystem A in order to obtain performance information of the storage subsystem A. Resources whose performance information is to be obtained by the storage subsystem monitoring agent 232 are the port N (341) to the port P (343), the logical volume A (344) to the logical volume D (347), the RAID group A (348), the RAID group B (349), and the physical disks (350 to 357).

Each logical volume is allotted in advance to a RAID group, which in turn is allotted to a physical disk. These resources are therefore in a dependence relation with one another. Once pairing between the volumes of the host servers A and B and the logical volumes of the storage subsystem (which host server volume is allotted to which logical volume) is established, a path from a port (the port A or B) of a host bus adaptor (the host server A or B) to a port of the storage subsystem via ports of the SAN switches is determined as a transfer path of input/output data exchanged between a pair. The input/output load applied to the volumes of the host servers A and B therefore equals the communication load applied to the ports along the data transfer path, meaning that a volume-logical volume pair is in dependence relation with ports along a path between the pair.

In the example of FIG. 3, the volume A of the host server A is allotted to the logical volume A, the logical volume A is allotted to the RAID group A, and the RAID group A is allotted to the physical disks 350 to 357. The data transfer path of the pair consisting of the volume A and the logical volume A stretches from the port A to the port C, the port D, the port H, the port I and to the port N. The volume A-logical volume A pair is in a dependence relation with these ports.

The resources that are close to the applications 240a to 240c are called upstream of the performance dependence relation whereas the resources that are close to the physical disks are called downstream of the performance dependence relation. In the example of FIG. 3, the application A is upstream of the file system A and the file system A is upstream of the volume A.

FIG. 4A shows an example of the configuration of the metrics value table 110 provided in each of the device monitoring agents 21 (each of the host monitoring agents 210, the SAN switch monitoring agent 231, and the storage subsystem monitoring agent 232).

The metrics value table 110 is composed of a resource identifier storing field 411, a metrics identifier storing field 412, a metrics value storing field 413, a T1 storing field 414, and a T2 storing field 415.

The resource identifier storing field 411 is for storing identifiers of resources whose performance information is collected by the device monitoring agents 20. The metrics identifier storing field 412 is for storing identifiers of types of metrics to be collected. Metrics values to be stored in (set to) the metrics value storing field 413 by the device monitoring agents 20 are metrics values which are obtained, during a period started at a time specified in the T1 storing field 414 and ended at a time specified in the T2 storing field 415, from resources specified in the resource identifier storing field 411 and which are specified by identifiers in the metrics identifier storing field 412.

There are four types of metrics to be monitored by the device monitoring agents 20: response time, throughput, resource utilization amount, and resource utilization ratio. An example of throughput is I/O count per second. A metrics identifier in this embodiment is I/O count per second, but it does not limit application of this embodiment to other metrics identifiers which represent device/software performance.

FIG. 4B shows the contents of a metrics value table 401 of the host monitoring agent A (210 in FIG. 1), which is an example of the device monitoring agents 20 and which monitors the host server A (205) in this embodiment.

The metrics value table 401 shows that the host monitoring agents A collects and stores metrics once every hour from the file system A, the volume A, the port A, and other monitor subjects of the host monitoring agent A.

The first row of the metrics value table 401 holds a record stating that the I/O count per second collected from the file system A during a period from 10 o'clock to 11 o'clock on Jan. 11, 2000 is 1,214.5.

As the host monitoring agent A has the metrics value table 401, the host monitoring agent B which monitors the host server B (206) has a metrics value table 501 shown in FIG. 5, the storage subsystem monitoring agent 232 has a metrics value table 601 shown in FIG. 6, and the SAN switch monitoring agent 231 has a metrics value table 701 shown in FIG. 7. All metrics value tables of the device monitoring agents 20 have the same configuration, and the metrics value tables 501, 601, and 701 are respectively composed of resource identifier storing fields (502, 602, and 702), which are for storing resource types, metrics identifier storing fields (503, 603, and 703), which are for storing values representing metrics types, metrics value storing fields (504, 604 and 704), which are for storing metrics values corresponding to performance information, T1 storing fields (505, 605, and 705), which are for storing start date and time, and T2 storing fields (506, 606, and 706), which are for storing end date and time.

FIG. 8 is a diagram showing an example of the configuration of the metrics value table 113 that is used by the SAN performance management software 107. This table is created by using the performance information obtaining function 112 to put together the contents of all the metrics value tables of the device monitoring agents 20. The metrics value table 113 shares the same configuration with the metrics value table 110, and is composed of a resource identifier storing field (801), a metrics identifier storing field (802), a metrics value storing field (803), a T1 storing field (804), and a T2 storing field (805). Information stored in the metrics value table 113, which is used by the SAN performance management software 107, is consistent with an aggregation of information in every row of application-file system relation tables that all the device monitoring agents 20 have, except for a period in which collection by the performance information obtaining function 112 is delayed. Specifically, information in the metrics value table 113 corresponds to information in all rows of the metrics value tables 401, 501, 601, and 701 merged.

FIG. 9 is an explanatory diagram showing an example of a screen on which performance information is displayed in a graph format. The screen shows temporal transition of metrics values based on information in the metrics value table 113 of the SAN performance management software 107. The screen is displayed on the performance management client 144 by the performance analysis displaying function 143 of the SAN performance management software 107. An axis of abscissa (904) and axis of ordinate (905) of the graph respectively represent time and I/O count per second (902), which is one of metrics types, to display temporal transition of metrics values of plural resources (903).

Figure 10:
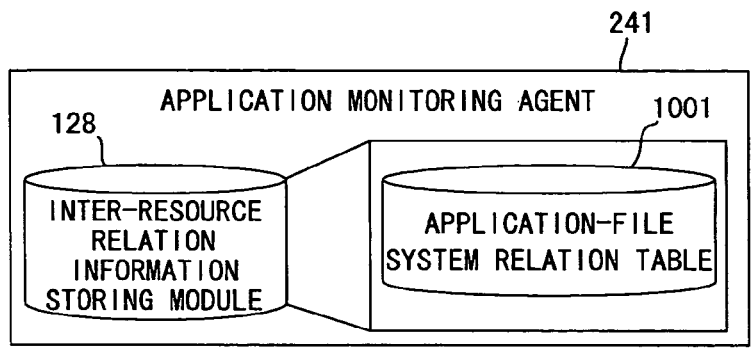
FIG. 10 is an explanatory diagram showing an example of the table configuration of an inter-resource relation information storing module in an application monitoring agent.

FIG. 10 shows that an application-file system relation table 1001 is contained in the inter-resource relation information storing module 128 of each of the application monitoring agents 241. The inter-resource relation information storing module 128 is a storage module to store one or more tables where a performance information dependence relation between resources is recorded. Details of the application-file system relation table 1001 will be described with reference to FIG. 14A.

Figure 11:
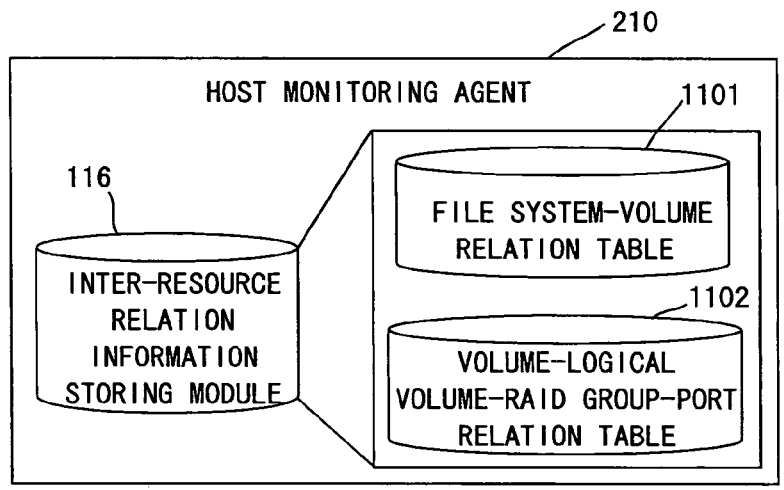
FIG. 11 is an explanatory diagram showing an example of the table configuration of an inter-resource relation information storing module in the host monitoring agent.

FIG. 11 is similar to FIG. 10 and shows that a file system-volume relation table 1101 and a volume-logical volume-RAID group-port relation table 1102 are contained in the inter-resource relation information storing module 116 of each of the host monitoring agents 210, which are one type of device monitoring agents. Details of the file system-volume relation table 1101 will be described with reference to FIG. 18A. Details of the volume-logical volume-RAID group-port relation table 1102, which concerns with the storage subsystems, will be described with reference to FIG. 21A.

Figure 12:
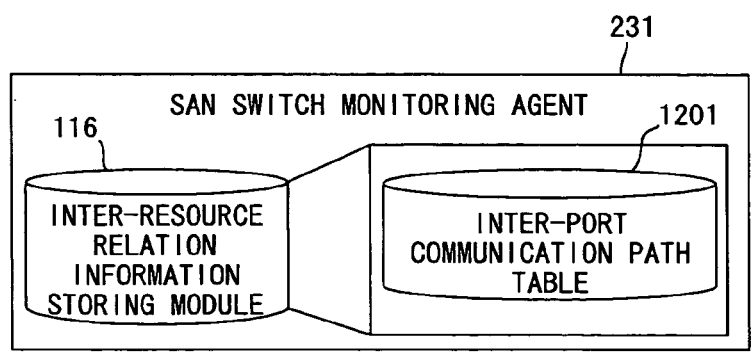
FIG. 12 is an explanatory diagram showing an example of the table configuration of an inter-resource relation information storing module in the SAN switch monitoring agent.

FIG. 12 is similar to FIG. 10 and shows that an inter-port communication path table 1201 stored in the inter-resource relation information storing module 116 of the SAN switch monitoring agent 231, which are one type of device monitoring agents 20. Details of the inter-port communication path table 1201 will be described with reference to FIG. 24.

Figure 13:
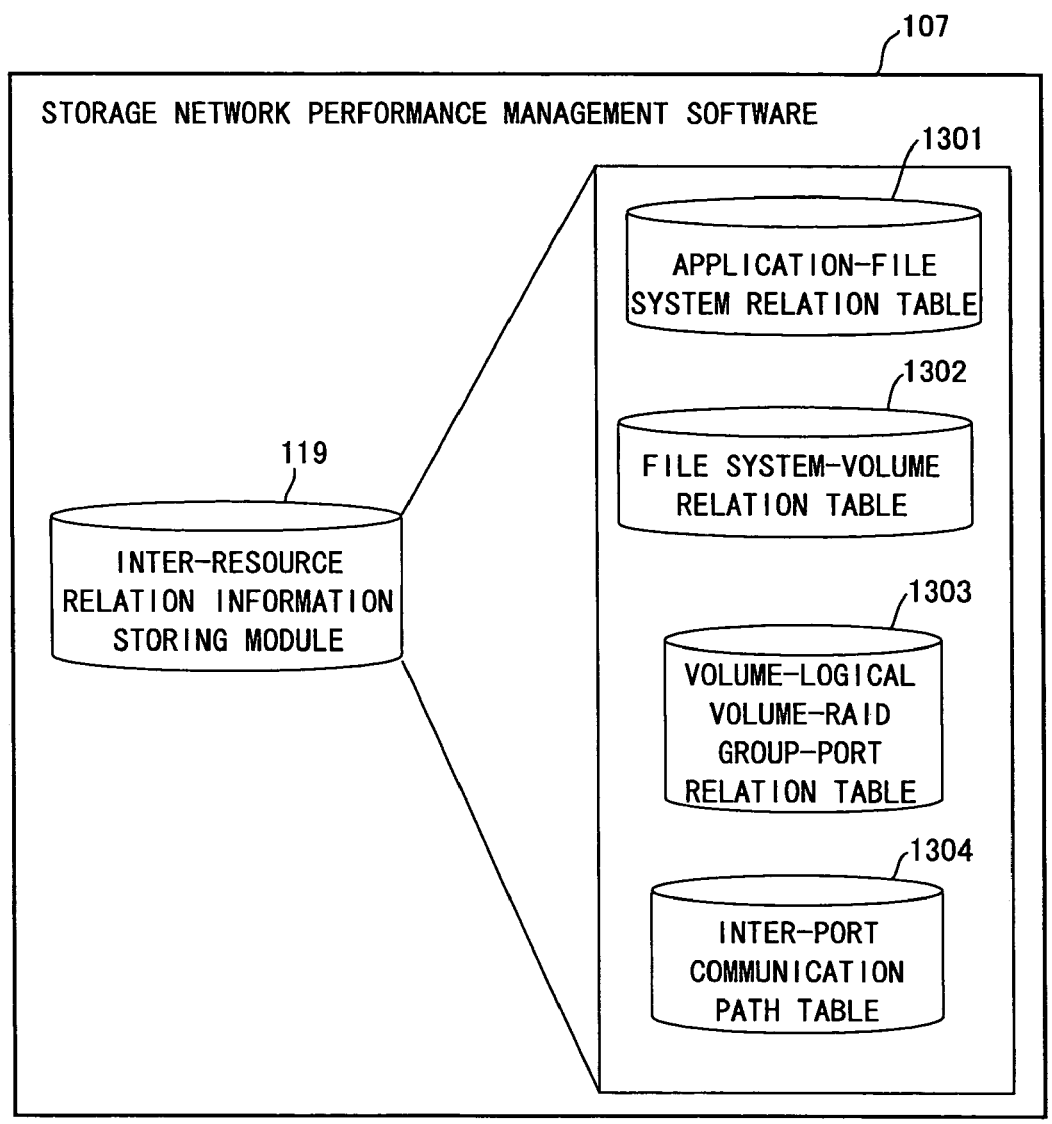
FIG. 13 is an explanatory diagram showing an example of the table configuration of an inter-resource relation information storing module in the storage network performance management software.

FIG. 13 shows that an application-file system relation table 1301, a file system-volume relation table 1302, a volume-logical volume-RAID group-port relation table 1303, and an inter-port communication path table 1304 are contained in the inter-resource relation information storing module 119 of the SAN performance management software 107. The inter-resource relation information storing module 119 of the SAN performance management software 107 is a storage module where inter-resource relation information collected by all the device monitoring agents 20 are amassed. The contents of the tables contained in the inter-resource relation information storing module 119 are an aggregation of data in every row of the relevant tables contained in the inter-resource relation information storing modules of the device monitoring agents. Details of the application-file system relation table 1301 will be described later with reference to FIG. 17.

Details of the file system-volume relation table 1302 will be described with reference to FIG. 20. Details of the volume-logical volume-RAID group-port relation table 1303 will be described with reference to FIG. 23. Details of the inter-port communication table 1304 will be described with reference to FIG. 25.

FIG. 14A shows an example of the configuration of the application-file system relation table 1001 stored in the inter-resource relation information storing module 128 of each of the application monitoring agents 241.

The application-file system relation table 1001 is for recording the performance dependence relation between an application and a file system which has been described with reference to FIG. 3. The application-file system relation table 1001 is composed of an application identifier storing field 1411, which is for storing identifiers of applications, a file system identifier storing field 1412, which is for storing identifiers of file systems, an effective period start time storing field 1413, which is for storing the start date and time of an effective period, and an effective period end time storing field 1414, which is for storing the end date and time of the effective period. Registered in each row of this table are a pair of an application and a file system that are in a dependence relation with each other, and one period during which the pair is in the dependence relation.

The configuration information obtaining function 127,115 of the application monitoring agents 241 and of the device monitoring agents 20 is periodically activated by a timer following a preset schedule, or activated upon request from the SAN performance management software 107. Once activated, the configuration information obtaining function requests the configuration information obtaining function of the applications 240 and devices to be monitored by the agents to send performance dependence relation information about the applications and the device. For instance, the application monitoring agent A which monitors the application A of the host server A shown in FIG. 3 requests a list of file systems the application A uses. When the performance dependence relation information received from the application A is not changed from the dependence relation information that has been collected the last time, the application monitoring agent A writes the current time in the effective period end time field for an update. When the performance dependence relation information is changed from the last time it is collected, the table is given an additional row which indicates a new performance dependence relation. The time of the preceding collection of dependence relation information is set as the effective period start time in the additional row and the present collection time is set as the effective period end time. In the case of initial collection, there is no preceding collection and any past time can be set as the effective period start time in the additional row.

FIG. 14B shows the contents of an application-file system relation table 1401 stored in the inter-resource relation information storing module of the application monitoring agent A (one of agents 241), which is an example of the application monitoring agents in this embodiment and which monitors the application A (240a) running on the host server A (205). The application-file system relation table 1401 shares the same configuration with the table 1001, and is composed of an application identifier storing field 1402, a file system identifier storing field 1403, an effective period start time storing field 1404, and an effective period end time storing field 1405. The first row of the application-file system relation table 1401 holds a record stating that the application A has been in a performance dependence relation with the file system A during a period from 00:00 on Jan. 1, 2000 to 13:00 on Jan. 14, 2000.

As the application monitoring agent A has the table 1401, an application monitoring agent B, which monitors the application B (240b) running on the host server A (205), has, in its inter-resource relation information storing module 128, an application-file system relation table 1501 shown in FIG. 15 as an example whereas an application monitoring agent C, which monitors the application C (240c) running on the host server B (206), has, in its inter-resource relation information storing module 128, an application-file system relation table 1601 shown in FIG. 16 as an example.

The tables 1501 and 1601 have the same configuration as the application-file system relation table 1401, and are respectively composed of application identifier storing fields (1502 and 1602), file system identifier storing fields (1503 and 1603), effective period start time storing fields (1504 and 1604) and effective period end time storing fields (1505 and 1605). The respective fields hold the same type of data as the fields in the table 1401.

FIG. 17 shows an example of the configuration of the application-file system relation table 1301 stored in the inter-resource relation information storing module 119 of the SAN performance management software 107. The application-file system relation table 1301 stores information on a dependence relation between an application and a file system collected from every application monitoring agent. The table 1301 has a configuration similar to that of the application-file system relation table 1401, and is composed of an application identifier storing field 1701, a file system identifier storing field 1702, an effective period start time storing field 1703, and an effective period end time storing field 1704. Information stored in the application-file system relation table 1301 is consistent with information in every row of application-file system relation tables that all the application monitoring agents have merged, except for a period in which collection by the configuration information obtaining function 118 is delayed. Specifically, information in the application-file system relation table 1301 corresponds to information in all rows of the application-file system relation tables 1401, 1501 and 1601 merged.

FIG. 18A shows an example of the configuration of the file system-volume relation table 1101 stored in the inter-resource relation information storing module of each of the host monitoring agents 210. The file system-volume relation table 1101 is for recording the performance dependence relation between a file system and a volume which has been described with reference to FIG. 3. The file system-volume relation table 1101 is composed of a file system identifier storing field 1811, a volume identifier storing field 1812, an effective period start time storing field 1813, and an effective period end time storing field 1814. Registered in each row of this table are a pair of a file system and a volume that are in a dependence relation with each other, and one period during which the pair is in the dependence relation. The file system-volume relation tables of the host monitoring agents 210 are updated the same way as described with reference to FIG. 14A.

FIG. 18B shows the contents of a file system-volume relation table 1801 stored in the inter-resource relation information storing module of the host monitoring agent A, which is an example of the host monitoring agents 210 in this embodiment and which monitors the host server A (205). The a file system-volume relation table 1801 shares the same configuration with the table 1101, and is composed of a file system identifier storing field 1802, a volume identifier storing field 1803, an effective period start time storing field 1804, and an effective period end time storing field 18058. The first row of the file system-volume relation table 1801 holds a record stating that the file system A has been in a performance dependence relation with the volume A during a period from 00:00 on Jan. 1, 2000 to 13:00 on Jan. 14, 2000.

FIG. 19 shows an example of a file system-volume relation table 1901, which is similar to the table 1801 and which is stored in the inter-resource relation information storing module 116 of the host monitoring agent B which monitors the host server B (206). The file system-volume relation table 1901 has the same configuration as the table 1801, and is composed of a file system identifier storing field 1902, a volume identifier storing field 1903, an effective period start time storing field 1904, and an effective period end time storing field 1905. The respective fields hold the same type of data as the fields in the table 1801.

FIG. 20 shows an example of a file system-volume relation table 1302 stored in the inter-resource relation information storing module 119 of the SAN performance management software 107. The file system-volume relation table 1302 stores information on a dependence relation between a file system and a volume collected from every host monitoring agent. The file system-volume relation table 1302 shares the same configuration with the table 1801, and is composed of a file system identifier storing field 2001, a volume identifier storing field 2002, an effective period start time storing field 2003, and an effective period end time storing field 2004.

Information stored in the file system-volume relation table 1302 is consistent with information in every row of file system-volume relation tables that all the host monitoring agents have merged, except for a period in which collection by the configuration information obtaining function 118 is delayed. Specifically, information in the file system-volume relation table 1302 corresponds to information in all rows of the file system-volume relation tables 1801 and 1901 merged.

FIG. 21A shows an example of the configuration of a volume-logical volume-RAID group-port relation table 1102 (shown in FIG. 11) stored in the inter-resource relation information storing module 116 of each of the host monitoring agents 210.

The volume-logical volume-RAID group-port relation table 1102 is for recording the performance dependence relation between volumes, logical volumes, RAID groups, host-side ports, and storage-side ports which has been described with reference to FIG. 3. The volume-logical volume-RAID group-port relation table 1102 is composed of a volume identifier storing field 2111, which is for storing identifiers of volumes, a logical volume identifier storing field 2112, which is for storing identifiers of logical volumes, a RAID group identifier storing field 2113, which is for storing RAID groups to which logical volumes in question belong, a host-side port identifier storing field 2114, which is for storing host-side ports of the SAN switches, a storage-side port identifier storing field 2115, which is for storing storage-side ports of the SAN switches, an effective period start time storing field 2116, and an effective period end time storing field 2117. Registered in each row of this table are a set of a volume, a logical volume, a RAID group, and ports that are in a dependence relation with each other, and one period during which the set is in the dependence relation. Every volume-logical volume-RAID group-port relation table of the host monitoring agents is updated the same way as described with reference to FIG. 14A.

FIG. 21B shows the contents of a volume-logical volume-RAID group-port relation table 2101 stored in the inter-resource relation information storing module of the host monitoring agent A, which is an example of the host monitoring agents in this embodiment and which monitors the host server A (205). The volume-logical volume-RAID group-port relation table 2101 shares the same configuration with the table 1102, and is composed of a volume identifier storing field 2102, a logical volume identifier storing field 2103, a RAID group identifier storing field 2104, a host-side port identifier storing field 2105, a storage-side port identifier storing field 2106, an effective period start time storing field 2107, and an effective period end time storing field 2108. The first row of the volume-logical volume-RAID group-port relation table 2101 holds a record stating that the volume A has been in a performance dependence relation with the logical volume A, the RAID group A, the port A, and the port N during a period from 00:00 on Jan. 1, 2000 to 13:00 on Jan. 14, 2000.

FIG. 22 shows an example of a volume-logical volume-RAID group-port relation table 2201, which is similar to the table 2101, of the host monitoring agent which monitors the host server B (206). The volume-logical volume-RAID group-port relation table 2201 has the same configuration as the table 2101, and is composed of a volume identifier storing field 2202, a logical volume identifier storing field 2203, a RAID group identifier storing field 2204, a host-side port identifier storing field 2205, a storage-side port identifier storing field 2206, an effective period start time storing field 2207, and an effective period end time storing field 2208. The respective fields hold the same type of data as the fields in the table 2101.

FIG. 23 shows an example of the volume-logical volume-RAID group-port relation table 1303 stored in the inter-resource relation information storing module 119 of the SAN performance management software 107. The volume-logical volume-RAID group-port relation table 1303 stores information on a dependence relation between a volume, a logical volume, a RAID group, a host-side port, and a storage-side port collected from every host monitoring agent. The table configuration shown in FIG. 23 is similar to that of the table 2101, and is composed of a volume identifier storing field 2301, a logical volume identifier storing field 2302, a RAID group identifier storing field 2303, a host-side port identifier storing field 2304, a storage-side port identifier storing field 2305, an effective period start time storing field 2306, and an effective period end time storing field 2307.

Information the table shown in FIG. 23 stores is consistent with information in every row of volume-logical volume-RAID group-port relation tables that all the host monitoring agents have merged, except for a period in which collection by the configuration information obtaining function 118 is delayed. Specifically, information in the volume-logical volume-RAID group-port relation table 1303 corresponds to information in all rows of the volume-logical volume-RAID group-port relation tables 2101 and 2201 merged.

FIG. 24A shows an example of an inter-port communication path table 1201 stored in the inter-resource relation information storing module 116 of the SAN switch monitoring agent 231, which monitors the SAN switches (320 to 323) on the storage network. The inter-port communication path table 1201 is for recording the performance dependence relation between ports along a path from a host-side port to a storage-side port which has been described with reference to FIG. 3. The inter-port communication path table 1201 is composed of a host-side port identifier storing field 2411, which is for storing an identifier of host-side ports of the SAN switches, a storage-side port identifier storing field 2412, which is for storing an identifier of storage-side ports of the SAN switches, a port-group-on-communication-path identifier storing field 2413, which is for storing identifiers of ports on a communication path within the SAN 2, an effective period start time storing field 2414, which is for storing the start date and time of an effective period, and an effective period end time storing field 2415, which is for storing the end date and time of the effective period.

Registered in each row of this table are a pair of a host-side port and a storage-side port that are in a dependence relation with each other, a group of ports on a communication path between the specified host-side port and the specified storage-side port, and one period during which all the above ports are in a dependence relation with one another. The inter-port communication path table 1201 of the SAN switch monitoring agent 231 is updated the same way as described with reference to FIG. 14A.

FIG. 24B shows the contents of an inter-port communication path table 2401 stored in the inter-resource relation information storing module 116 of an example of the SAN switch monitoring agent 231 in this embodiment. The inter-port communication path table 2401 shares the same configuration with the table 1201, and is composed of a host-side port identifier storing field 2402, a storage-side port identifier storing field 2403, a port-group-on-communication-path identifier storing field 2404, an effective period start time storing field 2405, and an effective period end time storing field 2406. The first row of the inter-port communication path table 2401 holds a record stating that the port A, the port C, the port D, the port H, the port I, and the port N have been in a performance dependence relation with one another during a period from 00:00 on Jan. 1, 2000 to 13:00 on Jan. 14, 2000.

FIG. 25 shows an example of the inter-port communication path table 1304 stored in the inter-resource relation information storing module 119 of the SAN performance management software 107. The inter-port communication path table 1304 stores information on every performance dependence relation between ports along a path from a host-side port to a storage-side port which is collected from the SAN switch monitoring agent 231. The table configuration shown in FIG. 25 is similar to that of the table 2401, and is composed of a host-side port identifier storing field 2501, a storage-side port identifier storing field 2502, a port-group-on-communication-path identifier storing field 2503, an effective period start time storing field 2504, and an effective period end time storing field 2505.

Information the table shown in FIG. 25 stores is consistent with an aggregation of information in every row of the inter-port communication path table that the SAN switch monitoring agent 231 has, except for a period in which collection by the configuration information obtaining function 118 is delayed. Since every SAN switch is monitored by the single SAN switch monitoring agent 231 in this embodiment, the contents of the inter-port communication path table 1304 coincide with the contents of the table 2401.

Figures 26, 27A, 27B:
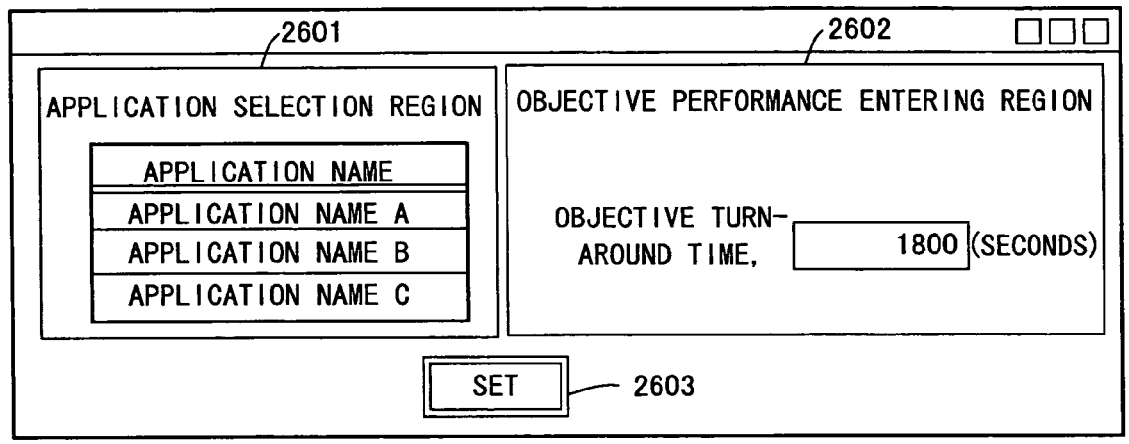
FIG. 26 is an explanatory diagram showing an example of a screen on which the objective performance of an application is set.
FIG. 27A is a diagram showing an example of the configuration of an application performance deterioration period determining rule table in which the objective performance of the application is stored.
FIG. 27B is a diagram showing an example of application performance deterioration period determining rules the application monitoring agent A has.

FIG. 26 shows an example of a screen on which an application performance deterioration judging rule is set. The screen is displayed on the performance management client 144 by the objective application performance setting function 133. This screen has an application selection region 2601, an objective performance entering region 2602, and a set button 2603. A user selects an application from options displayed in the application selection region 2601, inputs an objective turn-around time (response time) in the objective performance entering region 2603, and then depresses (or clicks on) the set button 2603. As the set button is depressed, the objective application performance setting function 133 updates the application performance deterioration period determining rule 132 of one of the application monitoring agents 241 that monitors the application chosen by the user.

FIG. 27A shows an example of the table configuration of the application performance deterioration period determining rule 132. The application performance deterioration period determining rule 132 is composed of an application identifier storing field 2711, which is for storing an identifier of an application, and an objective turn-around time storing field 2712, which is for storing an objective turn-around time as an objective response time of an application. An identifier of an application chosen by a user is stored in the application identifier storing field 2711, and an objective turn-around time inputted by the user is stored in the objective turn-around time storing field 2712.

FIG. 27B shows the contents of an application performance deterioration period determining rule 2701 of the application monitoring agent A, which is an example of the application monitoring agents in this embodiment and which monitors the application A (240*a*) running on the host server A (205). The application performance deterioration period determining rule 2701 shares the same configuration with the table 132, and is composed of an application identifier storing field 2702 and an objective turn-around time storing field 2703. The application performance deterioration period determining rule 2701 holds a record stating that 1800 seconds are set as the objective turn-around time of the application A (240*a*).

The application monitoring agent B, which monitors the application B, has an application performance deterioration period determining rule 2801 shown in FIG. 28 as an example, and the application monitoring agent C, which monitors the application C, has an application performance deterioration period determining rule 2901 shown in FIG. 29 as an example.

The application performance deterioration period determining rules 2801 and 2901 share the same configuration as the table 2701, and are respectively composed of application identifier storing fields (2801 and 2901) and objective turn-around time storing fields (2802 and 2902). The respective fields hold the same type of data as the fields in the table 2701.

FIG. 30A shows an example of the configuration of the application performance deterioration period table 134 each application monitoring agent 241 has. The application performance deterioration period table 134 stores performance deterioration periods of the monitor subject applications 240 which are detected by the application monitoring agents 241. The table shown in FIG. 30A is composed of an application identifier storing field 3011, which is for storing an identifier of an application, a performance deterioration start time storing field 3012, which is for storing the date and time performance deterioration is started, and a performance deterioration end time storing field 3013, which is for storing the date and time performance deterioration is ended.

The application performance deterioration period detecting function 131 of the application monitoring agents 241 consults the above-described application performance deterioration period determining rule 132 and the log 130 outputted by the applications to detect a performance deterioration period of the application it monitors.

This embodiment uses log information outputted from an application to detect performance deterioration of the application. Alternatively, information necessary for detection of performance deterioration may be received from an application through communications with the application, or an application itself may be a judge of its performance deterioration and write in a performance deterioration period table. This embodiment does not limit the use of those methods.

FIG. 30B shows an application performance deterioration period table 3001 of the application monitoring agent A, which monitors the application A (240a). The application performance deterioration period table 3001 shares the same configuration with the table 134, and is composed of an application identifier storing field 3002, a performance deterioration start time storing field 3003, and a performance deterioration end time storing field 3004. The first row of the application performance deterioration period table 3001 holds a record stating that the performance of the application A has deteriorated during a period from 10:30 on Jan. 11, 2000 to 11:10 on Jan. 11, 2000.

As the application monitoring agent A has the table 3001, the application monitoring agent B, which monitors the application B (240b), has an application performance deterioration period table 3101 shown in FIG. 31 and the application monitoring agent C, which monitors the application C (240c), has an application performance deterioration period table 3201 shown in FIG. 32. The tables shown in FIGS. 31 and 32 share the same configuration as the table 134, and are respectively composed of application identifier storing fields (3102 and 3202), performance deterioration start time storing fields (3103 and 3203), and performance deterioration end time storing fields (3104 and 3204). The respective fields hold the same type of data as the fields in the table 134.

FIG. 33 shows an example of the application performance deterioration period table 137 of the SAN performance management software 107. The application performance deterioration period table 137 stores application performance deterioration periods collected from the application monitoring agents A, B and C. The table shown in FIG. 33 has a configuration similar to that of the table 134, and is composed of an application identifier storing field (3301), a performance deterioration start time storing field (3302), and a performance deterioration end time storing field (3303). Information the table shown in FIG. 33 stores is consistent with information in every row of application performance deterioration period tables that all the application monitoring agents have merged, except for a period in which collection by the application performance deterioration information obtaining function 136 is delayed. Specifically, information in the application performance deterioration period table 137 corresponds to information in all rows of the application performance deterioration period tables 3101, 3201 and 3301 merged.

FIG. 34 shows an example of the deletion data control table 139 of the SAN performance management software 107. The deletion data control table 139 is composed of a performance deterioration start time storing field 3401, which is for storing the date and time performance deterioration of the applications 240 is started, a performance deterioration end time storing field 3402, which is for storing the date and time the performance deterioration is ended, and a performance dependent resource storing field 3403, which is for storing identifiers of resources that are related to the applications 240. Each row in this table shows that an application has been deteriorated in performance and has been in performance dependence relation with a resource defined in the performance dependent resource storing field 3403 during a performance deterioration period defined in the performance deterioration start time storing field 3401 and the performance deterioration end time storing field 3402. The non-deletion subject resource calculating function 138 of the SAN performance management software 107 updates the deletion data control table 139. Referring to flow charts of FIGS. 38 and 39, how the deletion data control table 139 is updated will be described in detail.

In the example of FIG. 34, the deletion data control table 139 is created by using the non-deletion subject resource calculating function 138 to process data of four tables (the application-file system relation information table 1301, the file system-volume relation information table 1302, the volume-logical volume-RAID group-port relation table 1303, and the inter-port communication path table 1304) in the inter-resource relation information storing module 119 of the SAN performance management software 107 and the application deterioration period table 137. Although the example of the deletion data control table 139 shown in FIG. 34 only lists information on performance deterioration periods of the application A, the same processing is performed for the application B and the application C.

Figures 35, 36:
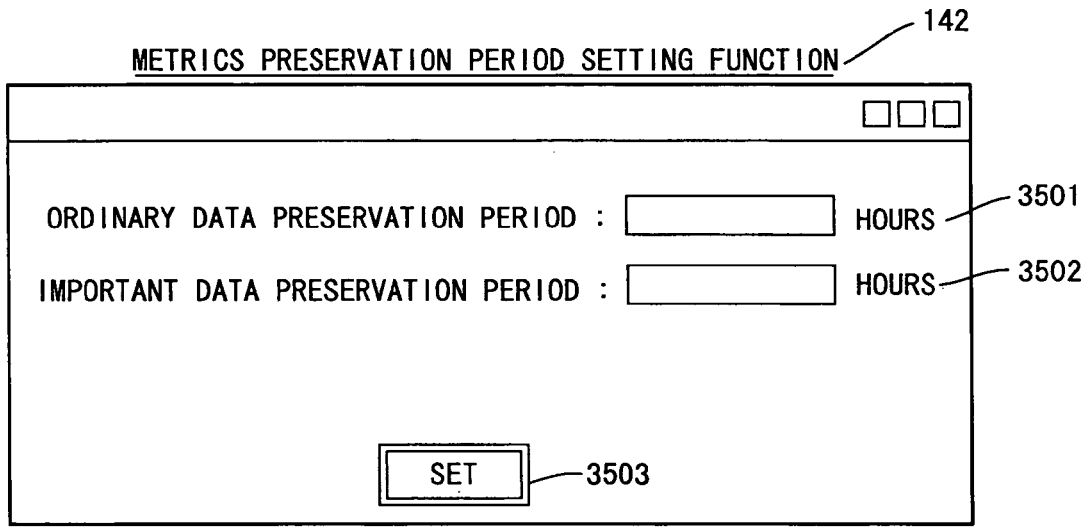
FIG. 35 is an explanatory diagram showing an example of a screen on which a metrics preservation period is set.
FIG. 36 is an explanatory diagram showing an example of the configuration and contents of a table the storage network performance management software has to store a metrics preservation period.

FIG. 35 is an example of a screen on which a metrics preservation period is set. The screen is sent by the metrics preservation period setting function 142 to the performance management client 144 to be displayed on a display device of the performance management client 144. The screen has an ordinary data preservation period entering region 3501, an important data preservation period entering region 3502, and a set button 3503. The term important data means metrics collected from a resource that is in a dependence relation with an application during a period in which the performance of the application has deteriorated. The term ordinary data refers to metrics that does not fit the definition of important data. A user enters preservation periods in the ordinary data preservation period entering region 3501 and the important data preservation period entering region 3502, and then depresses the set button 3503. This causes the metrics preservation period setting function 142 to store the entered ordinary data preservation period and important data preservation period in the metrics preservation period table 141.

FIG. 36 shows an example of the metrics preservation period table 141, which stores preservation periods of ordinary data and important data. The metrics preservation period table 141 is composed of a preservation period type storing field 3601 and a preservation period (time) storing field 3602 where an ordinary data preservation period value 3603 and an important data preservation period value 3604 are stored.

Figure 37:
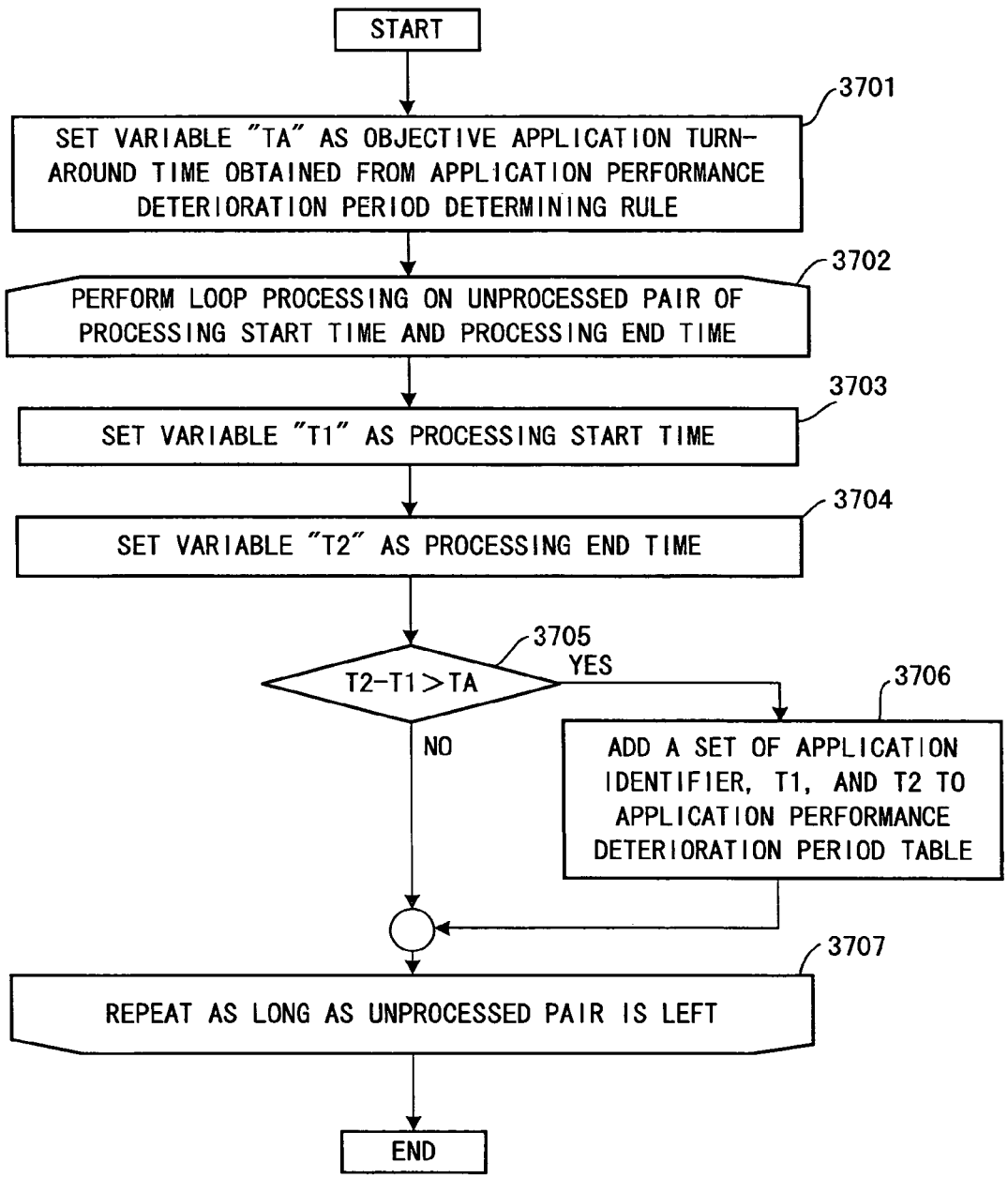
FIG. 37 is a flow chart showing an example of processing to determine an application performance deterioration period.

FIG. 37 is a flow chart of the application performance deterioration period detecting function 131 the application monitoring agents 241 have. This flow chart is composed of initialization processing (3701) and loop processing (3702 through 3707). Given below is a description of the flow chart:

First, in the step S3701, an objective turn-around time of an application is obtained from the application performance deterioration period determining rule 132 (shown in FIG. 27) and is set as a variable TA. The procedure then proceeds to the step S3702.

In the step S3702, pairs of unprocessed processing start time and processing end time are obtained from the log 130, and loop processing is started separately for the respective obtained pairs. Then the procedure proceeds to the step S3703, which is a starting step of intra-loop processing.

In the step S3703, the processing start time is set as a variable T1 and the procedure proceeds to the step S3404.

In the step S3704, the processing end time is set as a variable T2 and the procedure proceeds to the step S3405.

In the step S3705, the processing end time T2 minus T1 is compared with TA. When T2 minus T1 is larger than TA, it is judged that performance has deteriorated and the procedure proceeds to the step S3706. When T2 minus T1 is equal to or smaller than TA, it is judged that performance has not deteriorated and the procedure proceeds to the step S3707.

In the step S3706, a group composed of an identifier of an application whose performance deterioration has been detected, T1 set in the step S3703, and T2 set in the step S3704 is added to the application performance deterioration period table 134 (shown in FIG. 30A). The identifier of an application whose performance deterioration has been detected is stored in the column 3011, T1 is stored in the column 3012, and T2 is stored in the column 3013. Thereafter, the procedure proceeds to the step S3707.

In the step S3707, the procedure returns to the step S3702 as long as there is a row left to perform loop processing on.

Through the above processing, the application monitoring agents 241 create the application performance deterioration period table 134.

Figure 38:
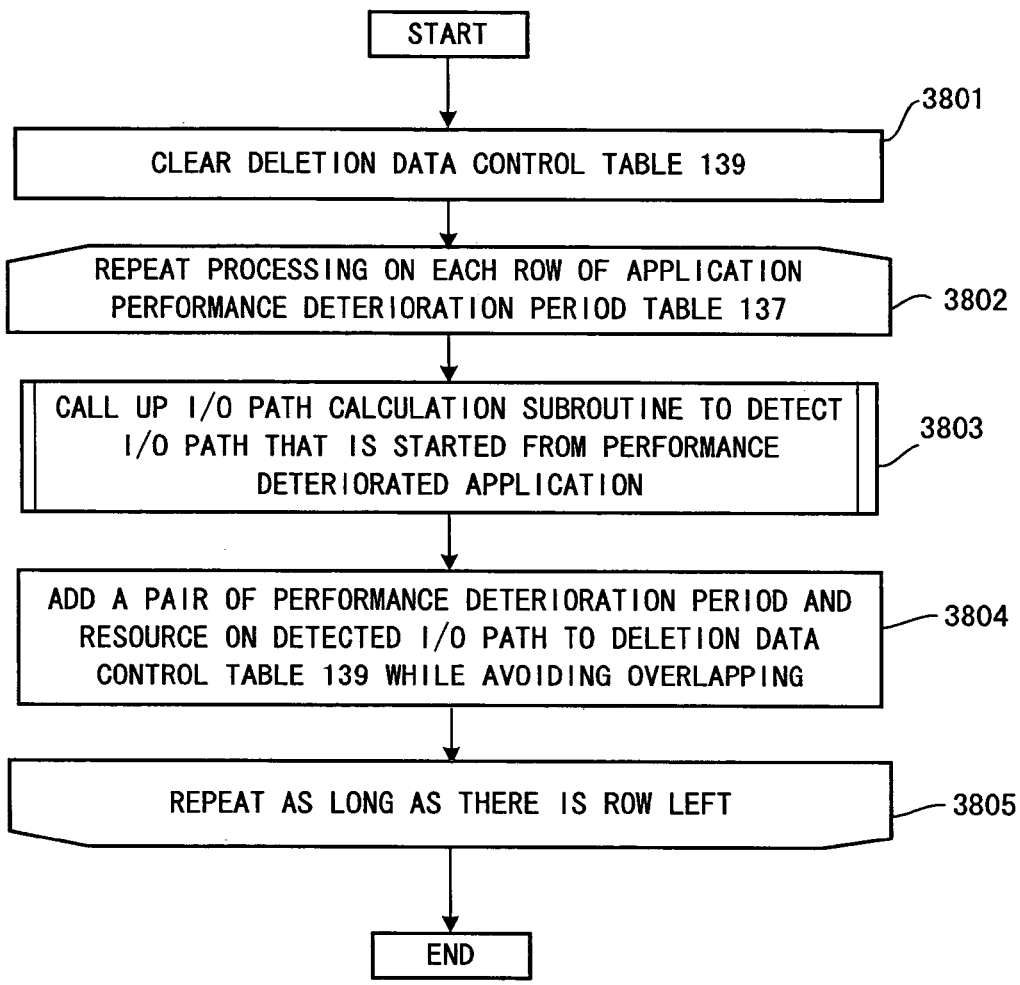
FIG. 38 is an example of a flow chart showing processing to detect a resource that is in dependence relation with an application whose performance has deteriorated in its performance deterioration period and to update the table for controlling metrics deletion.

FIG. 38 is a flow chart showing the non-deletion subject resource calculating function 138 executed by the SAN performance management software 107. The flow chart illustrates processing to detect a resource group on an I/O command processing path (I/O path) starting from an application whose performance has deteriorated and ending at a RAID group as resources obtained by tracing the detected I/O paths upstream and downstream to resources that have been in a performance dependence relation with the application whose performance has deteriorated.

Hereinafter, a path from an application to a physical disk along which an I/O command is processed is called an I/O path. The side of the I/O path that is close to the application is referred to as upstream whereas the side that is close to the physical disk is referred to as downstream. The flow chart of FIG. 38 is composed of initialization processing (3801) and loop processing (3802 through 3805). Given below is a description of the flow chart:

First, in the step S3801, initialization is conducted in which the contents of the deletion data control table 139 (shown in FIG. 34) are cleared. Thereafter, the procedure proceeds to the step S3802.

In the step S3802, the application performance deterioration period table 137 (shown in FIG. 33) is consulted to start loop processing on each row in the application performance deterioration period table 137. The procedure then proceeds to the step S3803, which is a starting step of intra-loop processing.

In the step S3803, an I/O path having as its starting point an application whose performance has deteriorated is detected in order to detect resources that have been in a performance dependence relation with this application during its performance deterioration period.

Figure 39:
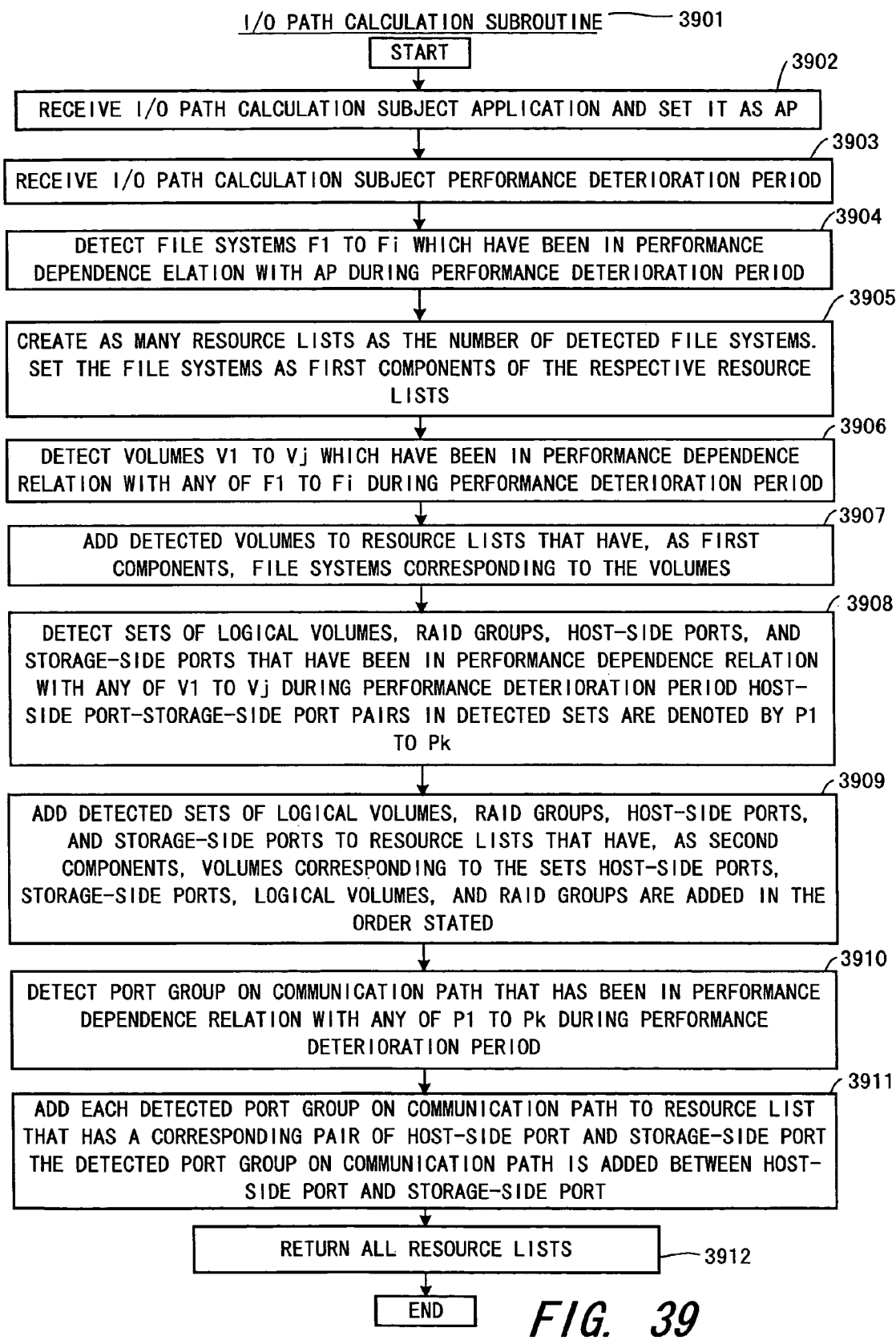
FIG. 39 is a diagram showing an example of a flow chart for detection of a resource on an I/O path having an application whose performance has deteriorated during its performance deterioration period as the starting point.

For detection of the I/O path, an I/O path calculation subroutine 3901, which will be described in detail with reference to FIG. 39, is called up. After the I/O path calculation subroutine is called up and the I/O path is detected, the procedure proceeds to the step S3804.

In the step S3804, resources along the I/O path detected in the step S3803 are stored in the deletion data control table 139 together with a pair of the performance deterioration start time and the performance deterioration end time while avoiding overlap. Thereafter, the procedure proceeds to the step S3805.

In the step S3805, the procedure returns to the step S3802 as long as a row to be processed is left in the application performance deterioration period table 137.

Through the above processing, collection subject components on every I/O path started from one of the applications 240 whose performance has deteriorated are treated as collection subject components that are in a performance dependence relation with this application.

FIG. 39 shows the I/O path calculation subroutine 3901 in which an application identifier and a performance deterioration period are received to calculate an I/O path having as its starting point an application identified by the application identifier during the performance deterioration period. Given below is a description of the I/O path calculation subroutine 3901, which is executed by the SAN performance management software 107.

In a first step S3902, an identifier of an application which is an I/O path calculation subject is received and is substituted into a variable AP. After the calculation, the procedure proceeds to a step S3903.

In the step S3903, a performance deterioration period of the I/O path calculation subject is received and the procedure proceeds to a step S3904.

In the step S3904, the application-file system relation table 1301 (shown in FIG. 17) is looked up to find file systems that have been in a performance dependent relation with the AP determined in the step S3902 during the performance deterioration period determined in the step S3903.

Specifically, all the rows in the application-file system relation table 1301 are searched to find rows in which the value in the application identifier storing field 1701 matches the AP and the period between the effective period start time 1703 and the effective period end time 1704 at least partially overlaps the performance deterioration period. A file system identified in the file system identifier storing filed 1702 of each row that has passed this screening is detected. The detected file systems are denoted by F1 to Fi. Then the procedure proceeds to a step S3905.

In the step S3905, as many resource lists as the number of file systems detected in the step S3904 are created. Each resource list represents one I/O path. The detected file systems are added as first components to the respective resource lists. Thereafter, the procedure proceeds to a step S3906.

In the step S3906, the file system-volume relation table 1302 (shown in FIG. 20) is looked up to find volumes that have been in a performance dependent relation with any of the file systems F1 to Fi detected in the step S3904 during the performance deterioration period of one of the applications 240 that has deteriorated in performance. The detected volumes are added to the resource lists. Specifically, all the rows in the file system-volume relation table 1302 are searched to find rows in which the value in the file system identifier storing field 2001 matches any of F1 to Fi and the period between the effective period start time 2003 and the effective period end time 2004 at least partially overlaps the performance deterioration period. A volume identified in the volume identifier storing filed 2002 of each row that has passed this screening is detected. The detected volumes are denoted by V1 to Vj. After the detection, the procedure proceeds to a step S3907.

In the step S3907, the volumes detected in the step S3906 are added to the resource lists in a manner that places a volume in a resource list whose first component is a file system that corresponds to this volume. After the addition, the procedure proceeds to a step S3908.

In the step S3908, the volume-logical volume-RAID group-port relation table 1303 (shown in FIG. 23) is looked up to find a set of a logical volume, a RAID group, a host-side port, and a storage-side port that has been in a performance dependence relation with any one of the volumes V1 to Vj detected in the step S3906 during the performance deterioration period. The detected set is added to the corresponding resource list. Specifically, all the rows in the volume-logical volume-RAID group-port relation table 1303 are searched to find rows in which the value in the volume identifier storing field 2301 matches any of V1 to Vj and the period between the effective period start time 2306 and the effective period end time 2307 at least partially overlaps the performance deterioration period. Then each row that has passed this screening is consulted to obtain a logical volume identified in the logical volume identifier storing filed 2302, a RAID group identified in the RAID group identifier storing field 2303, a host-side port identified in the host-side port storing field 2304, and a storage-side port identified in the storage-side port storing field 2305. Pairs of the detected host-side ports and storage-side ports are denoted by P1 to Pk. After the detection, the procedure proceeds to a step S3909.

In the step S3909, the set of a logical volume, a RAID group, a host-side port, and a storage-side port detected in the step S3908 is added to a resource list that has, as its second component, a logical volume that corresponds to the detected set. After the addition, the procedure proceeds to a step S3910.

In the step S3910, the inter-port communication path table 1304 (shown in FIG. 25) is looked up to find communication paths that have been in a performance dependence relation with any one of the host-side port-storage-side port pairs P1 to Pk detected in the step S3908 during the performance deterioration period. The detected communication paths are added to the resource lists. Specifically, all the rows in the inter-port communication path table 1304 are searched to find rows in which a pair of a host-side port identified in the host-side port identifier storing field 2501 and a storage-side port identified in the storage-side port identifier storing field 2502 matches any of P1 to Pk and the period between the effective period start time 2504 and the effective period end time 2505 at least partially overlaps the performance deterioration period. Then each row that has passed this screening is consulted to obtain a port group identified in the port-group-on-communication-path storing field 2503. After the detection, the procedure proceeds to a step S3911.

In the step S3911, the port group on the communication path that has been detected in the step S3910 is added to a resource list that has as its components the host-side port-storage-side port pair corresponding to the port group in a manner that makes the host-side port and storage-side port of the pair sandwich the port group. After the addition, the procedure proceeds to the step S3912.

In the step S3912, all the resource lists are returned.

The I/O path calculation subroutine 3901 in this embodiment creates a resource list by adding upstream resources on an I/O path first as the list's components and then moving onto downstream resources. Alternatively, it may be downstream resources that are added first and followed by upstream resources. This embodiment is not to limit such alternatives. An I/O path in this embodiment is a resource list whose first component is a file system that is used by an application, but this embodiment is open to other forms of I/O path.

Figure 40:
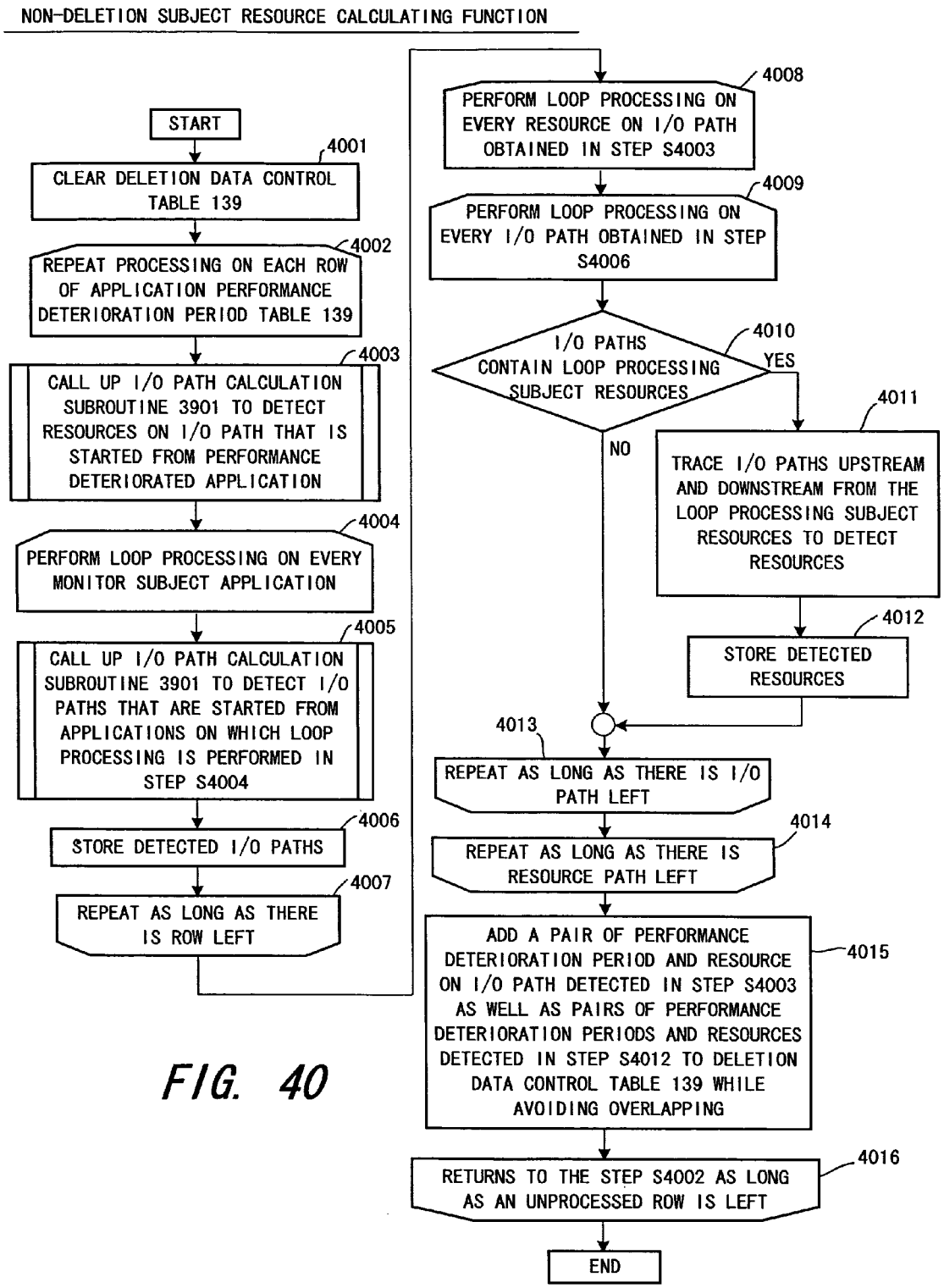
FIG. 40 is a flow chart showing another example (the previous example is shown in FIG. 38) of the processing to detect a resource that is in dependence relation with an application whose performance has deteriorated in its performance deterioration period and to update the table for controlling metrics deletion.

FIG. 40 is a flow chart showing another example of the non-deletion subject resource calculating function 138 of the SAN performance management software 107. The flow chart illustrates processing to detect a resource group on an I/O path starting from an application whose performance has deteriorated and ending at a RAID group, to detect every I/O path whose components include the detected resources, and to add resources obtained by tracing the detected I/O paths upstream and downstream to resources that have been in a performance dependence relation with the application whose performance has deteriorated. The flow chart is composed of initialization processing (4001) and main loop processing (4002 through S4011). The main loop processing contains two loops (4004 through 4006) (4007 through 4009). Given below is a description of the flow chart:

First, in the step S4001, the contents of the deletion data control table 139 are cleared. Thereafter, the procedure proceeds to the step S4002.

In the step S4002, the application performance deterioration period table 137 (shown in FIG. 33) is consulted to start loop processing on each row in the application performance deterioration period table 137. In the following description, an application identified in the application identifier storing field 3301 of the table 137 is regarded as performance deteriorated application and the period between the performance deterioration start time 3302 and the performance deterioration end time 3303 is regarded as performance deterioration period. The procedure then proceeds to the step S4003, which is a starting step of intra-loop processing.

In the step S4003, an I/O path having as its starting point an application whose performance has deteriorated is detected in order to detect resources that have been in a performance dependence relation with this application during its performance deterioration period. For detection of the I/O path, the I/O path calculation subroutine 3901 is called up. After the I/O path calculation subroutine is called up and the I/O path is detected, the procedure proceeds to the step S4004.

The step S4004 is a starting step of loop processing to detect an I/O path for every application. In the step S4004, every application identifier in the application identifier storing field of the application-file system relation table 1301 is obtained while avoiding overlapping, and loop processing is started on each of the obtained application identifiers. Once the application identifiers are obtained, the procedure proceeds to the next step in the loop, namely, the step S4005.

In the step S4005, resources that have been in a performance dependence relation with the applications subjected to loop processing in the step S4004 during performance deterioration periods of the applications are detected by detecting I/O paths having as their starting points the applications whose performance has deteriorated. For detection of the I/O paths, the I/O path calculation subroutine 3901 is called up. After the I/O path calculation subroutine is called up and the I/O paths are detected, the procedure proceeds to the step S4006.

In the step S4006, the I/O paths detected in the step S4005 for the respective applications are stored and then the procedure proceeds to the step S4007.

In the step S4007, the procedure returns to the step S4004 as long as there is an application on which loop processing is to be performed. When there is none left, the procedure proceeds to the step S4008.

In the step S4008, loop processing is started on every resource on the I/O path which has been detected in the step S4003 to have a performance deteriorated application as its starting point. In other words, the procedure moves on to the step S4009, which is a first step in the performance deterioration loop.

In the step S4009, loop processing is started on the I/O paths that have been stored in the step S4006 for the respective applications. The procedure moves on to the step S4010, which is a first step in the loop.

In the step S4010, whether or not the I/O paths on which loop processing is performed contain the resources that have been subjects of loop processing in the step S4008 is detected. Specifically, whether or not the resource lists representing the I/O paths contain the resources that have been subjects of loop processing in the step S4008 is detected. When those resources are found in the resource lists, the procedure proceeds to the step S4011 and, if not, the procedure proceeds to a step S4013.

In the step S4011, resources are detected by tracing the I/O paths upstream and downstream starting from the resources that have been subjects of loop processing in the step S4008. Although the I/O paths are traced upstream and downstream both in this embodiment, it is also possible to trace in the upstream or downstream direction alone. This embodiment is not to limit the direction in which the I/O paths are traced. After the resources are detected, the procedure proceeds to a step S4012.

In the step S4012, the detected resources are stored and the procedure proceeds to the step S4013.

In the step S4013, the procedure returns to the step S4009 as long as there is an I/O path on which loop processing is to be performed. When there is none left, the procedure proceeds to a step S4014.

In the step S4014, the procedure returns to the step S4008 as long as there is an I/O path on which loop processing is to be performed. When there is none left, the procedure proceeds to a step S4015.

In the step S4015, a pair of a performance deterioration period and a resource on the I/O path detected in the step S4003 as well as pairs of performance deterioration periods and the resources detected in the step S4012 are added to the deletion data control table 139 while avoiding overlapping. Then the procedure proceeds to a step S4016.

In the step S4016, the procedure returns to the step S4002 as long as an unprocessed row is left in the application performance deterioration period table 137. When there is none left, the procedure is ended.

In short, I/O paths related to some of the applications 240 that have deteriorated in performance are detected by the loop in the steps S4002 through S4007, and resources upstream and downstream along I/O paths detected by the loop in the steps S4008 through S4016 are used to create the deletion data control table 139 (see FIG. 34).

FIG. 41 is an explanatory diagram showing types of data deleted by the metrics deleting function 140. In FIG. 41, an arrow 4101 represents a time axis, and three points (a current time 4102, an ordinary data preservation limit 4103, and an important data preservation limit 4104) are marked on the time axis. The ordinary data preservation period 3603 is a period from the current time to the ordinary data preservation limit 4103. The important data preservation period 3604 is a period from the current time to the important data preservation limit 4104. Blocks (4105 to 4107) in FIG. 41 express the concept of how metrics values are processed in the respective periods.

As indicated by the blocks 4105 to 4107, the metrics deleting function 140 stores all metrics types during the ordinary data preservation period 3603 (the block 4105). During a period past the ordinary data preservation period 3603 and within the important data preservation period 3604, the function 140 stores only metrics types that correspond to important data are stored while deleting ordinary data (the block 4106). After the important data preservation period 3604 passes, the function 140 deletes all metrics types (the block 4107).

Figure 42:
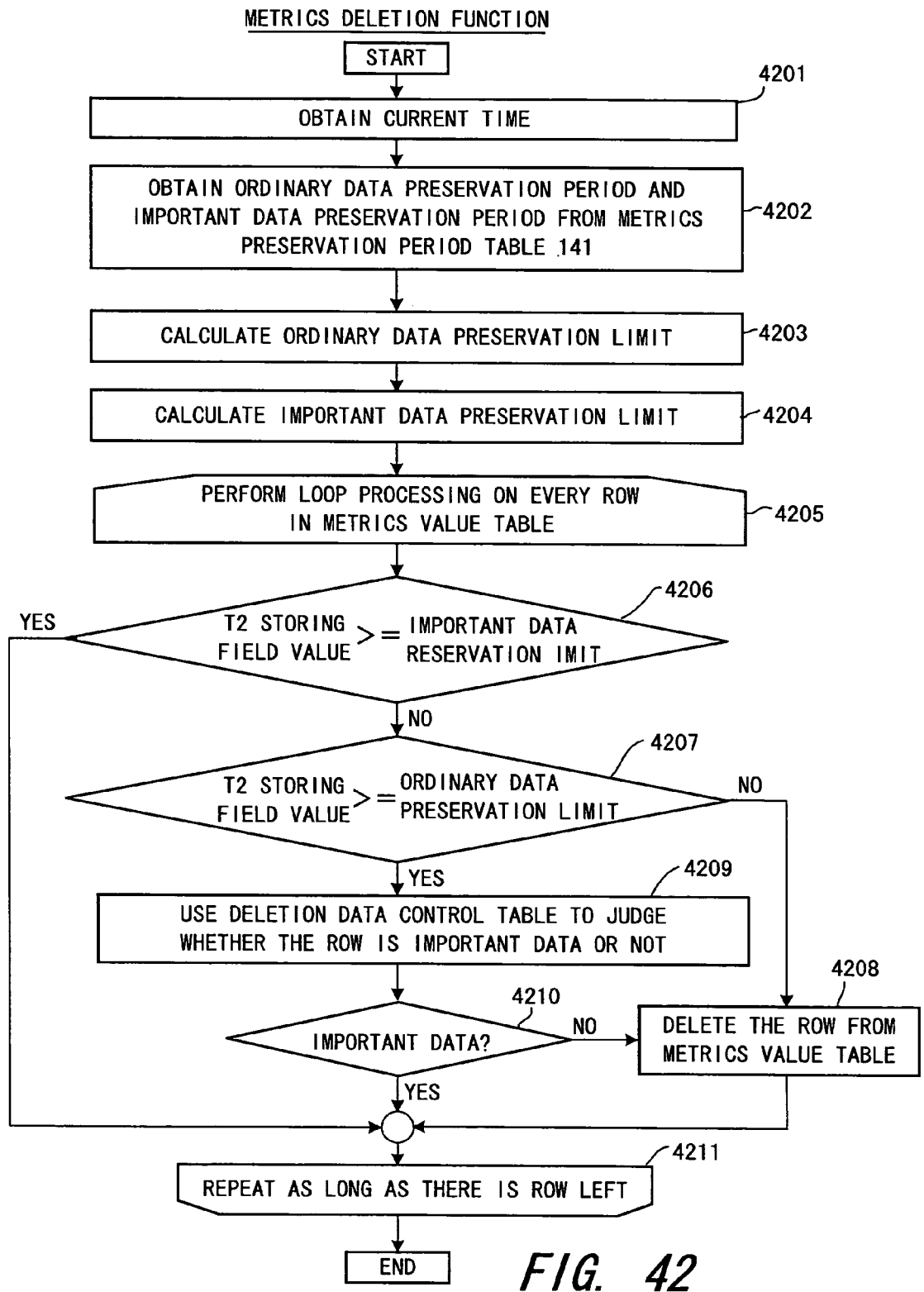
FIG. 42 is a flow chart showing an example of metrics deletion processing.

FIG. 42 is a flow chart showing an example of the deletion method of the metrics deleting function 140 which has been described with reference to FIG. 41. The flow chart is composed of initialization processing (4201 through 4204) and loop processing (steps S4205 to S4211).

First, in the step S4201, the current time 4102 is obtained. The procedure then proceeds to the step S4202.

In the step S4202, the ordinary data preservation period 3603 and the important data preservation period 3604 are obtained from the metrics preservation period table 141 (shown in FIG. 36). Thereafter, the procedure proceeds to the step S4203.

In the step S4203, a past time point reached by counting back from the current time 4102 for a period corresponding to the ordinary data preservation period 3603 is set as the ordinary data preservation limit 4103. Then the procedure proceeds to the step S4204.

In the step S4204, a past time point reached by counting back from the current time 4102 for a period corresponding to the ordinary data preservation period 3604 is set as the important data preservation limit 4104. Thereafter, the procedure proceeds to the step S4205.

In the step S4205, loop processing is started on every row in the metrics value table 113 (shown in FIG. 8). The procedure then proceeds to the step S4206, which is a starting step of intra-loop processing. In the subsequent intra-loop processing, (4206 through S4210), execution of deleting processing is controlled according to the T2 value in a row on which loop processing is to be performed. A T2 value indicates the time a metrics value is collected and stored.

In the step S4206, the T2 value in a row on which loop processing is to be performed is compared against the ordinary data preservation limit 4103. When the T2 value is equal to or larger than the ordinary data preservation limit 4103, in other words, when the metrics preservation time is within the ordinary data preservation period 3603, the procedure proceeds to the step S4211. On the other hand, when the T2 value is smaller than the ordinary data preservation limit 4103, namely, when the metrics preservation time is past the ordinary data preservation period 3603, the procedure-proceeds to the step S4207.

In the step S4207, the T2 value in a row on which loop processing is to be performed is compared against the important data preservation limit 4104. When the T2 value is equal to or larger than the important data preservation limit 4104, in other words, when the metrics preservation time is within the important data preservation period 3604, the procedure proceeds to the step S4209. On the other hand, when the T2 value is smaller than the important data preservation limit 4104, namely, when the metrics preservation time is past the ordinary data preservation period 3604, the procedure proceeds to the step S4208.

In the step S4208, the processing of deleting the loop processing subject row from the metrics value table 113. After the deletion, the procedure proceeds to the step S4211.

In the step S4209, whether the row in question is important data or not is judged. This judging processing uses the deletion data control table 139 to conduct the following two tests on the loop processing subject row. Passing the two tests means that the loop processing subject row is important data.

(Test 1) A resource identifier of this row is found in the performance dependent resource identifier storing field 3403 of the deletion data control table 139.

(Test 2) At least a portion of the period between T1 and T2 of this row is included in the period defined by the performance deterioration start time storing field 3401 of the row in the deletion data control table 139 that has the resource identifier of (Test 1) and by the performance deterioration end time storing field 3402 of the same row.

When the loop processing subject row is judged as important data as a result of conducting Test 1 and Test 2, the procedure proceeds to the step S4211. On the other hand, when it is judged that the loop processing subject row is not important data, the procedure proceeds to the step S4208.

In the step S4211, the procedure returns to the step 4205 as long as there is a row on which loop processing is to be performed.

Through the above processing, ordinary data that has passed a first preservation period (72 hours) is deleted from the metrics preservation period table 141 and important data is kept until a second preservation period (10 days) elapses.

Therefore, if it is within 10 days since one of the applications 240 has experienced performance deterioration, an I/O path that is used by this application and that is kept as important data, and metrics values upstream and downstream along this I/O path are available for reference. The cause of performance deterioration of the applications 240 can thus be tracked down based on detailed metrics values (performance information).

On the other hand, metrics values of an I/O path irrelevant to performance deterioration are automatically deleted after a normal preservation period passes. In this way, only necessary performance information out of a huge volume of performance information on the SAN 2, which is composed of the host servers 205 to 207 and many SAN switches and storage subsystems, is kept, and expanding the storage subsystem area for storage of performance information (metrics values) can be avoided.

The above embodiment uses the application monitoring agents 241, the host monitoring agents 210, the SAN switch monitoring agent 231, and the storage subsystem monitoring agent 232 to monitor devices and software. Alternatively, the SAN performance management software 107 may obtain performance information by directly communicating with devices and software to be monitored without the intermediation of those agents.

In the above embodiment, performance information is obtained via the SAN 2. Alternatively, the storage subsystem monitoring agent 232 may obtain performance information of the storage subsystems 224 to 226 and of their ports 227 to 229 via the LAN 204. Similarly, the SAN switch monitoring agent 231 may obtain performance information of the SAN switches 214 to 216 it monitors by communicating with the SAN switches 214 to 216 via the LAN 204. The SAN switch monitoring agent 231 and the storage subsystem monitoring agent 232, which, in the above embodiment, are run on the dedicated performance information collecting server 230, may be run on any other computer. The same applies to the application monitoring agents and the host monitoring agents, which are run on the host servers 205 to 207 in the above embodiment. The application monitoring agents and the host monitoring agents may be run on any other computer and obtain application performance information through communications.

In the step S4011 of FIG. 40, the I/O paths are traced upstream to detect collection subject components on all the I/O paths of the applications 240 whose performance has deteriorated, and to detect every application that has, as devices or software on the I/O path it uses, the detected collection subject components. Then collection subject components found by tracing the I/O path of each detected application downstream are set as collection subject components that have been in a performance dependence relation with the detected application.

In the step S4011 of FIG. 40, the I/O paths are traced downstream to detect collection subject components on all the I/O paths of the applications 240 whose performance has deteriorated, and to detect every application that has, as devices or software on the I/O path it uses, the detected collection subject components. Then collection subject components found by tracing the I/O path of each detected application upstream are set as collection subject components that have been in a performance dependence relation with the detected application.

The above embodiment shows as an example the case in which the SAN performance management software 107 deletes metrics values that have passed a given preservation period. Alternatively, the monitoring agents may delete metrics values that are specified by the SAN performance management software 107.

While the present invention has been described in detail and pictorially in the accompanying drawings, the present invention is not limited to such detail but covers various obvious modifications and equivalent arrangements, which fall within the purview of the appended claims.

What is claimed is:

1. A storage network performance information collecting and storing method for collecting and storing performance information on resources of a storage network having a network device that is placed between a computer and a storage system for transmission and reception of input/output data, comprising:

a performance information collecting step of collecting and storing performance information from collection subject components that are chosen in advance out of resources consisting of the storage network, the storage system, and the computer;

a performance dependence relation information collecting step of collecting and storing information on a performance dependence relation between the collection subject components;

an application performance deterioration period detecting step of collecting and storing a performance deterioration period of an application executed in the computer;

a dependence-relation-during-performance-deterioration detecting step of detecting collection subject components that have been in a performance dependence relation with the application whose performance has been deteriorated during the detected application performance deterioration period;

a preservation period setting step of setting a second preservation period longer than a normal preservation period is set for performance information of the collection subject components detected in the dependence-relation-during-performance-deterioration detecting step and setting the normal preservation period for performance information of other resources than the detected components; and a deleting step of deleting performance information that has passed one of the normal preservation period and the second preservation period.

2. The storage network performance information collecting and storing method according to claim 1, wherein the dependence-relation-during-performance-deterioration detecting step comprises setting, based on the performance dependence relation between collection subject components, collection subject components on a path that is reached by tracing the dependence relation from the application whose performance has deteriorated toward the downstream side of the storage network to which the application applies a performance load during the performance deterioration period, as collection subject components that have been in a performance dependence relation with the application.

3. The storage network performance information collecting and storing method according to claim 1, wherein the dependence-relation-during-performance-deterioration detecting step comprises:
  detecting, based on the performance dependence relation between collection subject components, collection subject components on a path that is reached by tracing the dependence relation from the application whose performance has deteriorated toward the downstream side of the storage network to which the application applies a performance load during the performance deterioration period; and
  setting collection subject components on a path that is reached by tracing the dependence relation from the detected collection subject components toward the upstream side to which a performance load is applied, as collection subject components that have been in a performance dependence relation with the application.

4. The storage network performance information collecting and storing method according to claim 1, wherein the dependence-relation-during-performance-deterioration detecting step comprises:
  detecting, based on the performance dependence relation between collection subject components, collection subject components on a path that is reached by tracing the dependence relation from the application whose performance has deteriorated toward the downstream side of the storage network to which the application applies a performance load during the performance deterioration period; and
  setting collection subject components on a path that is reached by tracing the dependence relation from the detected collection subject components toward the downstream side to which a performance load is applied, as collection subject components that have been in a performance dependence relation with the application.

5. The storage network performance information collecting and storing method according to claim 1, wherein the dependence-relation-during-performance-deterioration detecting step comprises:
  detecting, based on the performance dependence relation between collection subject components, collection subject components on a path that is reached by tracing the dependence relation from the application whose performance has deteriorated toward the downstream side of the storage network to which the application applies a performance load during the performance deterioration period; and
  setting collection subject components on a path that is reached by tracing the dependence relation from the detected collection subject components toward the downstream side and the upstream side to which a performance load is applied, as collection subject components that have been in a performance dependence relation with the application.

6. A program embodied on a computer-readable storage medium, for collecting and storing performance information on resources of a storage network having a network device that is placed between a computer and a storage system for communication of input/output data, wherein when executed by a computer, the program causes the computer to execute:
  the processing of collecting and storing performance information from collection subject components that are chosen in advance out of resources consisting of the storage network, the storage system, and the computer;
  the processing of collecting and storing information on a performance dependence relation between the collection subject components;
  the processing of collecting and storing a performance deterioration period of an application executed in the computer;
  a dependence-relation-during-performance-deterioration detecting processing of detecting collection subject components that have been in a performance dependence relation with the application whose performance has been deteriorated during the detected application performance deterioration period;
  a preservation period setting processing of setting a second preservation period longer than a normal preservation period for performance information of the collection subject components detected by the dependence-relation-during-performance-deterioration detecting processing and setting the normal preservation period for performance information of other resources than the detected components; and
  deleting performance information that has passed one of the normal preservation period and the second preservation period.

7. The program according to claim 6, wherein the dependence-relation-during-performance-deterioration detecting processing comprises setting, based on the performance dependence relation between collection subject components, collection subject components on a path that is reached by tracing the dependence relation from the application whose performance has deteriorated toward the downstream side of the storage network to which the application applies a performance load during the performance deterioration period, as collection subject components that have been in a performance dependence relation with the application.

8. The program according to claim 6, wherein the dependence-relation-during-performance-deterioration detecting processing comprises:
  detecting, based on the performance dependence relation between collection subject components, collection subject components on a path that is reached by tracing the dependence relation from the application whose performance has deteriorated toward the downstream side of the storage network to which the application applies a performance load during the performance deterioration period; and
  setting dollection subject components on a path that is reached by tracing the dependence relation from the detected collection subject components toward the upstream side to which a performance load is applied, as collection subject components that have been in a performance dependence relation with the application.

9. The program according to claim 6, wherein the dependence-relation-during-performance-deterioration detecting processing comprises:
- detecting, based on the performance dependence relation between collection subject components, collection subject components on a path that is reached by tracing the dependence relation from the application whose performance has deteriorated toward the downstream side of the storage network to which the application applies a performance load during the performance deterioration period; and
- setting collection subject components on a path that is reached by tracing the dependence relation from the detected collection subject components toward the downstream side to which a performance load is applied, as collection subject components that have been in a performance dependence relation with the application.

10. The program according to claim 6, wherein the dependence-relation-during-performance-deterioration detecting processing comprises:
- detecting, based on the performance dependence relation between collection subject components, collection subject components on a path that is reached by tracing the dependence relation from the application whose performance has deteriorated toward the downstream side of the storage network to which the application applies a performance load during the performance deterioration period; and
- setting collection subject components on a path that is reached by tracing the dependence relation from the detected collection subject components toward the downstream side and the upstream side to which a performance load is applied, as collection subject components that have been in a performance dependence relation with the application.

11. A computer system comprising:
- a computer which executes an application;
- a storage network which includes a network device placed between the computer and a storage system for transmission and reception of input/output data;
- a performance information collecting module which collects performance information from collection subject components that are chosen in advance out of resources consisting of the storage network, the storage system, and the computer, and which stores the collected performance information in a storage area set in advance;
- a performance dependence relation information collecting module which collects information on a performance dependence relation between the collection subject components based on the configuration of the storage network, and which stores the collected information on the performance dependence relation;
- a deterioration detecting module which detects performance deterioration of the application and which stores a period of performance deterioration of the application;
- a dependence-relation-during-performance-deterioration detecting module which detects collection subject components that have been in a performance dependence relation with the application whose performance has been deteriorated during the application performance deterioration period;
- a preservation period setting module which sets a second preservation period longer than a normal preservation period for performance information of the collection subject components detected by the dependence-relation-during-performance-deterioration detecting module, and which sets the normal preservation period for performance information of other resources than the detected components; and
- a deleting module which detects performance information that has passed one of the normal preservation period and the second preservation period to delete the performance information from the storage area.

12. The computer system according to claim 11, wherein in the dependence-relation-during-performance-deterioration detecting module, the performance dependence relation between collection subject components is used to set collection subject components on a path that is reached by tracing the dependence relation from the application whose performance has deteriorated toward the downstream side of the storage network to which the application applies a performance load during the performance deterioration period, as collection subject components that have been in a performance dependence relation with the application.

13. The computer system according to claim 11, wherein in the dependence-relation-during-performance-deterioration detecting module, the performance dependence relation between collection subject components is used to detect collection subject components on a path that is reached by tracing the dependence relation from the application whose performance has deteriorated toward the downstream side of the storage network to which the application applies a performance load during the performance deterioration period, and collection subject components on a path that is reached by tracing the dependence relation from the detected collection subject components toward the upstream side to which a performance load is applied are set as collection subject components that have been in a performance dependence relation with the application.

14. The computer system according to claim 11, wherein in the dependence-relation-during-performance-deterioration detecting module, the performance dependence relation between collection subject components is used to detect collection subject components on a path that is reached by tracing the dependence relation from the application whose performance has deteriorated toward the downstream side of the storage network to which the application applies a performance load during the performance deterioration period, and collection subject components on a path that is reached by tracing the dependence relation from the detected collection subject components toward the downstream side to which a performance load is applied are set as collection subject components that have been in a performance dependence relation with the application.

15. The computer system according to claim 11, wherein in the dependence-relation-during-performance-deterioration detecting module, the performance dependence relation between collection subject components is used to detect collection subject components on a path that is reached by tracing the dependence relation from the application whose performance has deteriorated toward the downstream side of the storage network to which the application applies a performance load during the performance deterioration period, and collection subject components on a path that is reached by tracing the dependence relation from the detected collection subject components toward the downstream side and the upstream side to which a performance load is applied are set as collection subject components that have been in a performance dependence relation with the application.

* * * * *